(12) United States Patent
Wada et al.

(10) Patent No.: US 10,812,737 B2
(45) Date of Patent: Oct. 20, 2020

(54) ON-VEHICLE DISPLAY CONTROLLER, ON-VEHICLE DISPLAY SYSTEM, ON-VEHICLE DISPLAY CONTROL METHOD, AND NON-TRANSITORY STORAGE MEDIUM

(71) Applicant: JVC KENWOOD Corporation, Yokohama-shi, Kanagawa (JP)

(72) Inventors: Yuki Wada, Yokohama (JP); Takeshi Yamazaki, Yokohama (JP); Toshiya Endo, Yokohama (JP); Hiroki Takahashi, Yokohama (JP); Takuji Teruuchi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 85 days.

(21) Appl. No.: 16/170,161

(22) Filed: Oct. 25, 2018

(65) Prior Publication Data
US 2019/0068899 A1 Feb. 28, 2019

Related U.S. Application Data

(63) Continuation of application No. PCT/JP2017/015196, filed on Apr. 13, 2017.

(30) Foreign Application Priority Data

Jul. 12, 2016 (JP) .................................. 2016-137715
Mar. 24, 2017 (JP) .................................. 2017-059082

(51) Int. Cl.
*H04N 5/262* (2006.01)
*G06K 9/00* (2006.01)
(Continued)

(52) U.S. Cl.
CPC ............. *H04N 5/2628* (2013.01); *B60R 1/00* (2013.01); *G06K 9/00791* (2013.01);
(Continued)

(58) Field of Classification Search
CPC ... B06R 1/002; G06K 9/0071; G06K 9/00791
See application file for complete search history.

(56) References Cited

U.S. PATENT DOCUMENTS

2002/0149476 A1* 10/2002 Ogura ....................... B60R 1/00
340/436
2009/0079553 A1* 3/2009 Yanagi ...................... B60R 1/00
340/435
(Continued)

FOREIGN PATENT DOCUMENTS

| JP | 2009-166624 | | 7/2009 |
| JP | 2009166624 A | * | 7/2009 |
| JP | 2014-235639 | | 12/2014 |

OTHER PUBLICATIONS

International Search Report and Written Opinion for International Patent Application No. PCT/JP2017/015196 dated Jul. 11, 2017, 9 pages.

*Primary Examiner* — Jeremiah C Hallenbeck-Huber
(74) *Attorney, Agent, or Firm* — Amin, Turocy & Watson, LLP

(57) ABSTRACT

There is provided an on-vehicle display controller including a video data acquiring unit configured to acquire captured video data obtained through imaging by an imager that is configured to image surroundings of a vehicle, a detecting unit configured to detect at least one following vehicle in the captured video data, an identifying unit configured to identify a lower part of the following vehicle detected by the detecting unit, a display video data generating unit configured to set a clipping area of the captured video data so as to include the lower part of the following vehicle identified (Continued)

by the identifying unit, and generate display video data by performing clipping the clipping area from the captured video data, and a display controller configured to cause a display used in the vehicle to display the display video data generated by the display video data generating unit.

14 Claims, 16 Drawing Sheets

(51) Int. Cl.
  *B60R 1/00* (2006.01)
  *H04N 7/18* (2006.01)
  *G06K 9/32* (2006.01)
(52) U.S. Cl.
  CPC ....... *G06K 9/00805* (2013.01); *G06K 9/3233* (2013.01); *H04N 7/183* (2013.01); *B60R 2300/306* (2013.01); *B60R 2300/605* (2013.01)

(56) References Cited

U.S. PATENT DOCUMENTS

| | | | | |
|---|---|---|---|---|
| 2009/0079585 A1* | 3/2009 | Chinomi | ................... | B60R 1/00 340/901 |
| 2012/0154591 A1* | 6/2012 | Baur | ......................... | B60R 1/00 348/148 |
| 2012/0169875 A1* | 7/2012 | Matsukawa | ............... | B60R 1/00 348/148 |
| 2014/0169633 A1* | 6/2014 | Seyfried | ............ | G06K 9/00791 382/105 |
| 2014/0347489 A1* | 11/2014 | Kumon | ................... | H04N 7/183 348/148 |
| 2015/0307024 A1* | 10/2015 | Fukuda | .................. | B60Q 9/008 382/103 |
| 2016/0150070 A1* | 5/2016 | Goren | ................... | H04W 48/04 455/404.2 |
| 2016/0263997 A1* | 9/2016 | Mizutani | ............. | B60W 40/076 |
| 2016/0300491 A1* | 10/2016 | Fukuda | .................. | G08G 1/167 |
| 2017/0036601 A1* | 2/2017 | Kimura | ..................... | B60R 1/00 |
| 2017/0305365 A1* | 10/2017 | Matsumoto | ............. | B60R 16/02 |

* cited by examiner

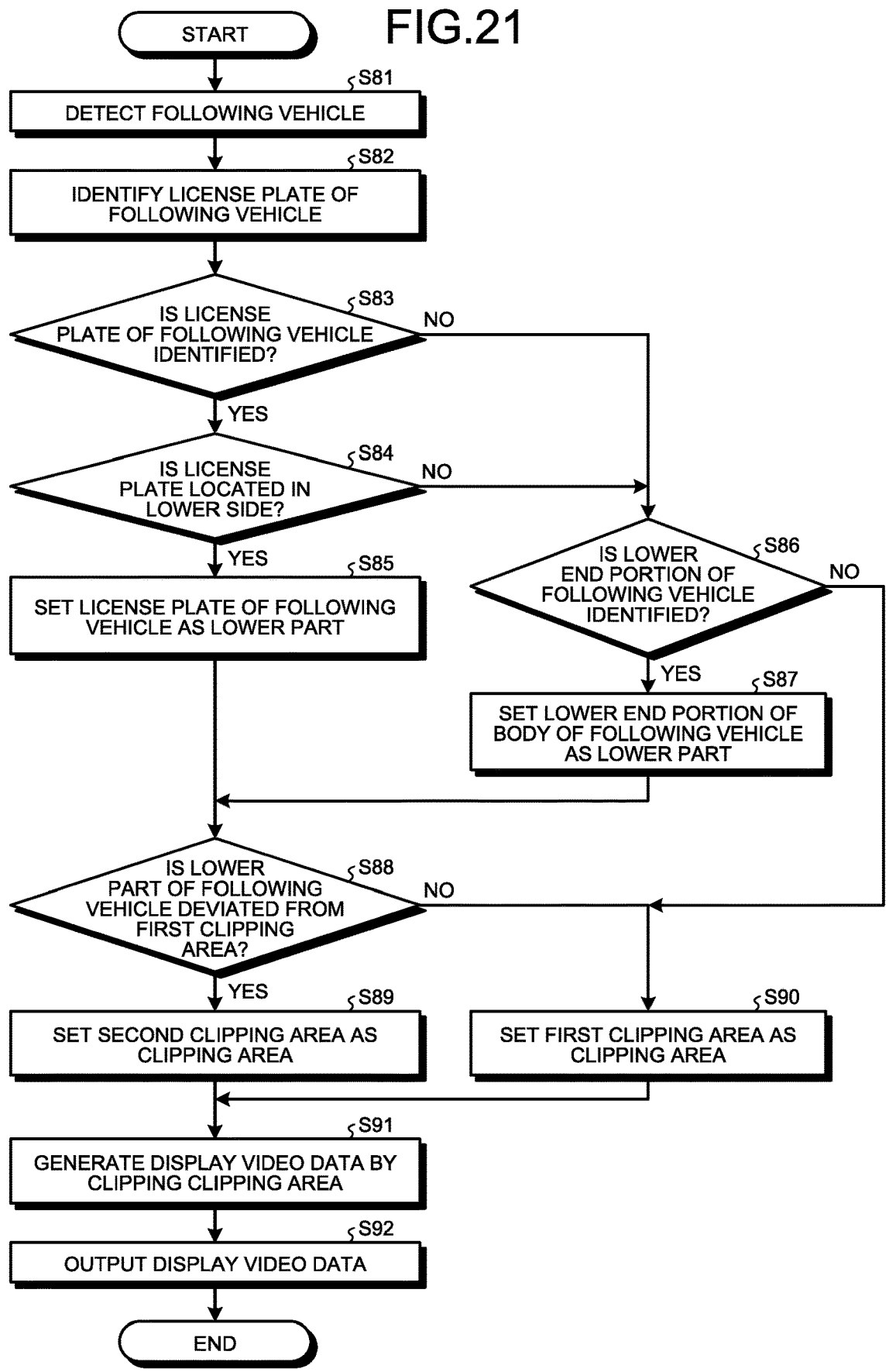

ON-VEHICLE DISPLAY CONTROLLER, ON-VEHICLE DISPLAY SYSTEM, ON-VEHICLE DISPLAY CONTROL METHOD, AND NON-TRANSITORY STORAGE MEDIUM

CROSS-REFERENCE TO RELATED APPLICATIONS

This application is a continuation of International Application No. PCT/JP2017/015196, filed on Apr. 13, 2017 which claims the benefit of priority of the prior Japanese Patent Application No. 2016-137715, filed on Jul. 12, 2016 and Japanese Patent Application No. 2017-059082, filed on Mar. 24, 2017, the entire contents of which are incorporated herein by reference.

FIELD

The present application relates to an on-vehicle display controller, an on-vehicle display system, an on-vehicle display control method, and a non-transitory storage medium.

BACKGROUND

A technology for what is called an electronic rearview mirror that displays video from an imager, which images a rear surrounding area of a vehicle, instead of a rear view mirror for checking a rear side of the vehicle has been known (for example, see Japanese Laid-open Patent Publication No. 2014-235639 and Japanese Patent No. 5136071).

Incidentally, it has been known that a distance to an object located at a short distance of about 10 meters (m) is recognized using an eye convergence angle or eye focus adjustment. Further, it has been known that the distance is recognized by comparing sizes or relationships of the objects and other surrounding objects.

However, since the electronic rearview mirror displays a real image of two-dimensional video in contrast to an optical rearview mirror, it is difficult to recognize a distance to an object using an eye convergence angle or eye focus adjustment. Further, in the technologies described in Japanese Laid-open Patent Publication No. 2014-235639 and Japanese Patent No. 5136071, the imager is arranged at a rear end of a vehicle or an inner rear end of the vehicle. Therefore, a mounting position of the imager is closer to a following vehicle than a mounting position of the optical rearview mirror, so that when the following vehicle approaches, a bottom end of the following vehicle and a road are not displayed on the electronic rearview mirror. In this manner, when the following vehicle approaches, it may be difficult to recognize a distance to the following vehicle with the use of the electronic rearview mirror.

SUMMARY

An on-vehicle display controller, an on-vehicle display system, an on-vehicle display control method, and a non-transitory storage medium According to one aspect, there is provided an on-vehicle display controller comprising: a video data acquiring unit configured to acquire captured video data obtained through imaging by an imager that is configured to image surroundings of a vehicle; a detecting unit configured to detect at least one following vehicle in the captured video data; an identifying unit configured to identify a lower part of the following vehicle detected by the detecting unit; a display video data generating unit configured to set a clipping area of the captured video data so as to include the lower part of the following vehicle identified by the identifying unit, and generate display video data by performing clipping the clipping area from the captured video data; and a display controller configured to cause a display used in the vehicle to display the display video data generated by the display video data generating unit.

According to one aspect, there is provided an on-vehicle display system comprising: the on-vehicle display controller described above; and at least one of the imager and the display.

According to one aspect, there is provided an on-vehicle display control method comprising steps of: acquiring captured video data obtained through imaging by an imager that is configured to image surroundings of a vehicle; detecting at least one following vehicle in the captured video data; identifying a lower part of the following vehicle detected at the detecting; setting a clipping area of the captured video data so as to include the lower part of the following vehicle identified at the identifying; generating display video data by performing clipping the clipping area from the captured video data; and causing a display used in the vehicle to display the display video data generated at the generating.

According to one aspect, there is provided a non-transitory storage medium that stores a program for causing a computer serving as an on-vehicle display controller to execute steps of: acquiring captured video data obtained through imaging by an imager that is configured to image surroundings of a vehicle; detecting at least one following vehicle in the captured video data; identifying a lower part of the following vehicle detected at the detecting; setting a clipping area of the captured video data so as to include the lower part of the following vehicle identified at the identifying; generating display video data by performing clipping the clipping area from the captured video data; and causing a display used in the vehicle to display the display video data generated at the generating.

The above and other objects, features, advantages and technical and industrial significance of this application will be better understood by reading the following detailed description of presently preferred embodiments of the invention, when considered in connection with the accompanying drawings.

BRIEF DESCRIPTION OF THE DRAWINGS

FIG. 21 is a flowchart illustrating an example of a flow of a process performed by a controller of an on-vehicle display controller of the on-vehicle display system according to the fifth embodiment.

DETAILED DESCRIPTION OF THE PREFERRED EMBODIMENTS

Embodiments of an on-vehicle display controller 10, an on-vehicle display system 1, an on-vehicle display control method, and a non-transitory storage medium according to the present application will be described in detail below with reference to the accompanying drawings. The present application is not limited by the embodiments below.

First Embodiment

Figure 1:
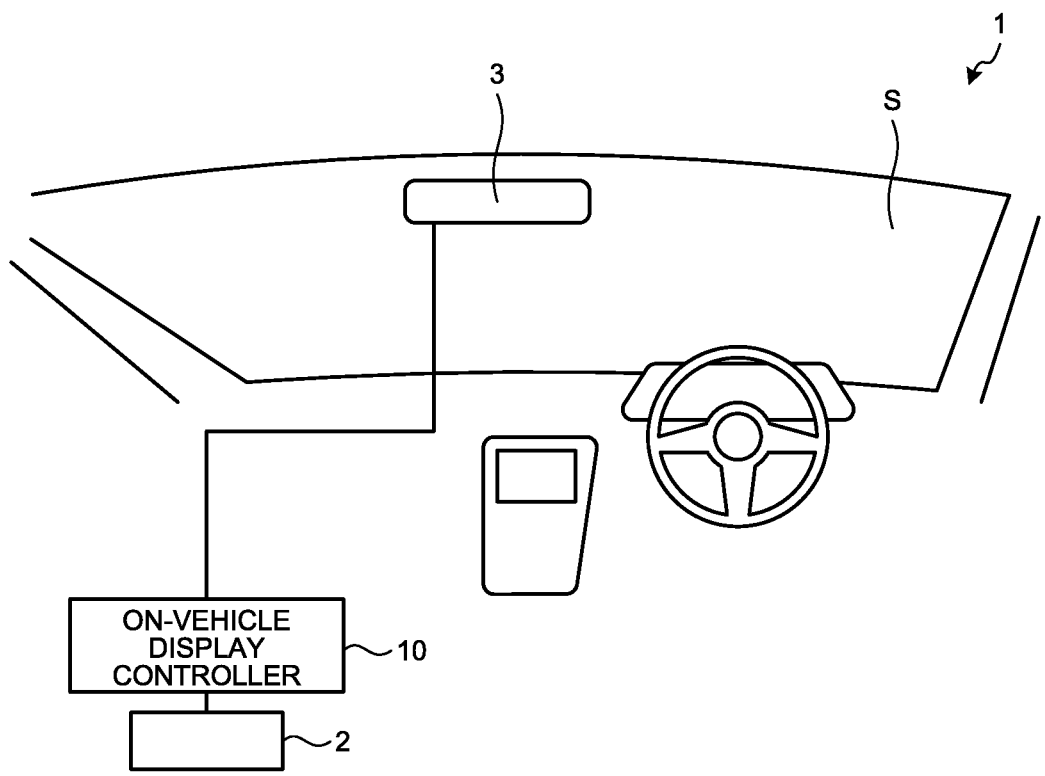
FIG. 1 is a schematic diagram illustrating a configuration example of an on-vehicle display system according to a first embodiment.
Figure 2:
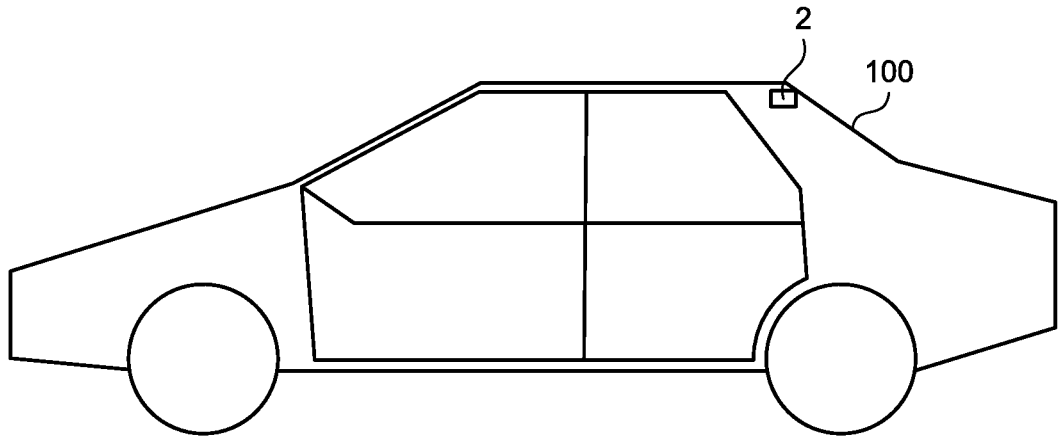
FIG. 2 is a schematic diagram illustrating a configuration example of the on-vehicle display system according to the first embodiment.
Figure 3:
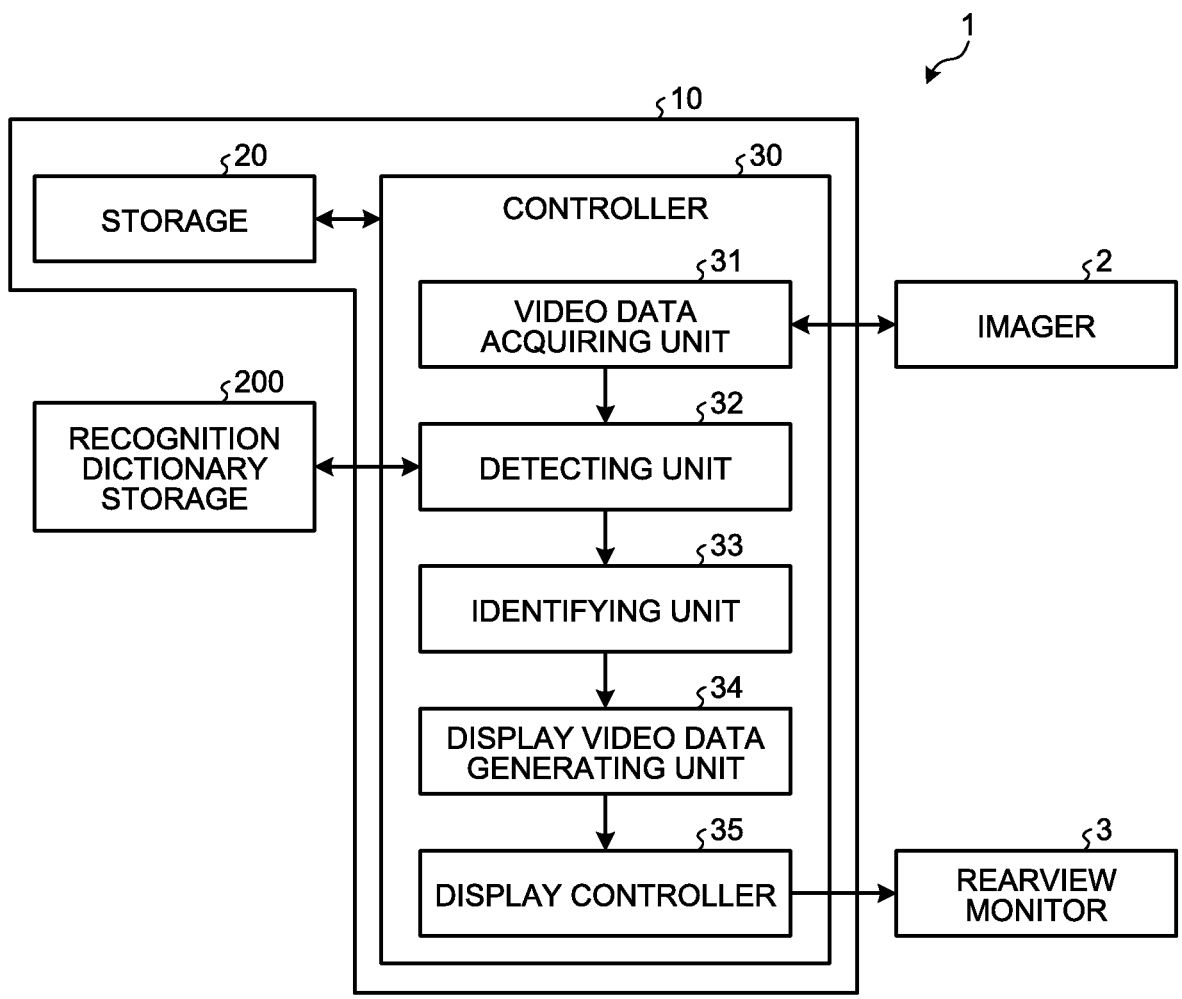
FIG. 3 is a block diagram illustrating a configuration example of the on-vehicle display system according to the first embodiment.

The on-vehicle display system 1 is mounted on a vehicle 100 and displays surroundings of the vehicle. FIG. 1 is a schematic diagram illustrating a configuration example of the on-vehicle display system according to a first embodiment. FIG. 2 is a schematic diagram illustrating a configuration example of the on-vehicle display system 1 according to the first embodiment. FIG. 3 is a block diagram illustrating a configuration example of the on-vehicle display system 1 according to the first embodiment.

As illustrated in FIG. 1 to FIG. 3, the on-vehicle display system 1 includes an imager 2, a rearview monitor (display) 3, the on-vehicle display controller 10, and a recognition dictionary storage 200. In the first embodiment, the rearview monitor 3 will be described. However, the disclosure is applicable to monitors that display video obtained by imaging a front side, a right side, and a left side, or side view monitors serving as door mirrors that display video obtained by imaging a right rear side and a left rear side of the vehicle 100.

The imager 2 is arranged on a rear part of the vehicle 100 and images a rear side of the vehicle 100. The imager 2 is arranged on, for example, an upper rear end inside the vehicle 100 or a rear end of a vehicle body. In the first embodiment, the imager 2 is arranged on an upper part of a rear window that is the upper rear end inside the vehicle 100. When the imager 2 is arranged on the upper rear end inside the vehicle 100, a mounting position of the imager 2 is located closer to a mounting position of an optical rearview mirror by 10 centimeters (cm) to 1 m as compared to a case where the imager is mounted on the rear part of the vehicle body. In other words, an imaging position of captured video data 110A obtained through imaging by the imager 2 is close to a viewpoint of the optical rearview mirror. Accordingly, a difference between the rearview by the captured video data 110A and the rear view by an optical rearview mirror can be reduced. Further, when the imager 2 is arranged on the upper rear end inside the vehicle 100, the mounting position of the imager 2 is located on the upper side as compared to a case where the imager 2 is mounted on the rear part of the vehicle body. Therefore, it becomes possible to easily image a far rear side.

Figure 4:
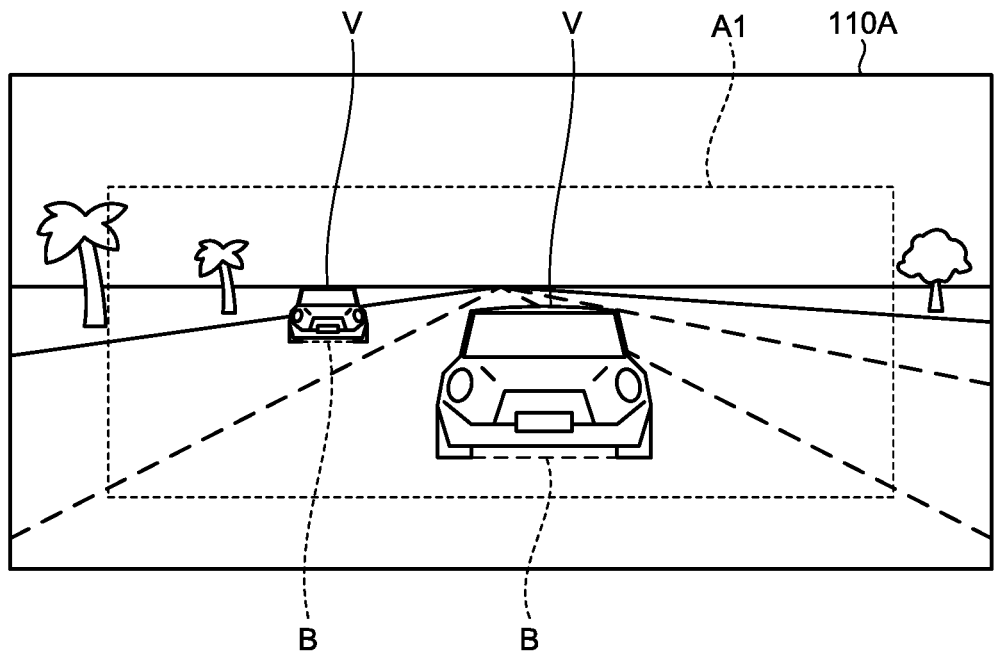
FIG. 4 is a diagram illustrating an example of captured video data obtained through imaging by an imager of the on-vehicle display system according to the first embodiment.

The imager 2 images an area including an area to be checked by the rearview monitor 3. A horizontal angle of view of the imager 2 is, for example, 30° to 60°, and a vertical angle of view of the imager 2 is, for example, 5° to 20°. Specifically, the imager 2 captures the captured video data 110A as illustrated in FIG. 4. FIG. 4 is a diagram illustrating an example of the captured video data obtained through imaging by the imager 2 of the on-vehicle display system 1 according to the first embodiment. The imager 2 is capable of capturing video in a wider area than the area displayed on the rearview monitor 3. However, an area that allows a driver of the vehicle 100 to appropriately recognize the rear side using the rearview monitor 3 is clipped as a clipping area, and displayed on the rearview monitor 3. The captured video data 110A includes the clipping area that is the area to be checked by the rearview monitor 3. In the first embodiment, the captured video data 110A includes an area outside the clipping area. In other words, the imager 2 normally images an area that is not displayed on the rearview monitor 3. The captured video data 110A includes, for example, 1920 pixels in the horizontal direction and 1080 pixels in the vertical direction. The imager 2 outputs the captured video data 110A obtained by imaging to a video data acquiring unit 31 of the on-vehicle display controller 10.

The rearview monitor 3 is, for example, an electronic rearview mirror. When the rearview monitor 3 is used as an electronic rearview mirror, it does not matter whether a half mirror for checking the rear side using optical reflection is provided or not therein. The rearview monitor 3 is, for example, a display including a liquid crystal display (LCD), an organic electro-luminescence (EL) display, or the like.

Figure 5:
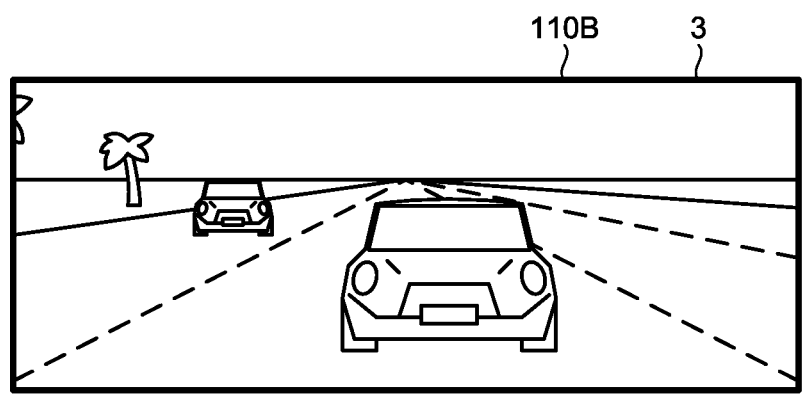
FIG. 5 is a diagram illustrating an example of video displayed on a rearview monitor of the on-vehicle display system according to the first embodiment.
Figure 6:
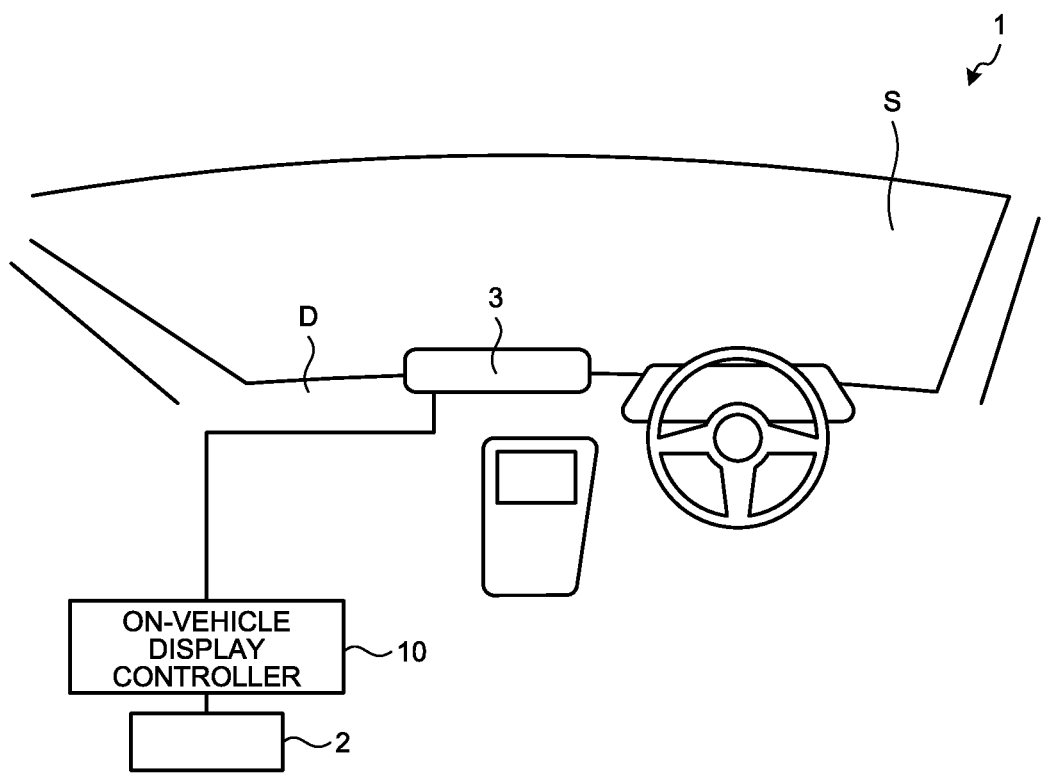
FIG. 6 is a schematic diagram illustrating another configuration example of the on-vehicle display system according to the first embodiment.

The rearview monitor 3 displays video of the rear side of the vehicle 100 based on a video signal output from a display controller 35 of the on-vehicle display controller 10. Specifically, the rearview monitor 3 displays rear video as illustrated in FIG. 5. FIG. 5 is a diagram illustrating an example of video displayed on the rearview monitor 3 of the on-vehicle display system 1 according to the first embodiment. The rearview monitor 3 is arranged at a certain position that can easily be viewed by the driver. In the first embodiment, the rearview monitor 3 is arranged in an upper central part of a windshield S in a vehicle-width direction. As illustrated in FIG. 6, the rearview monitor 3 may be arranged in an upper central part of a dashboard D in the vehicle-width direction. FIG. 6 is a schematic diagram illustrating another configuration example of the on-vehicle display system 1 according to the first embodiment.

When the rearview monitor 3 is used as a safety component of the vehicle 100 like the electronic rearview mirror, the rearview monitor 3 is mounted in a fixed manner in front of the driver. When the rearview monitor 3 is used not as the safety component but as an auxiliary device for checking a rear side, the rearview monitor 3 is not necessarily arranged in front of the driver, but may be arranged at a certain position that is appropriate for the driver to view when the driver uses the rearview monitor 3.

The recognition dictionary storage unit 200 stores therein, for example, a recognition dictionary that enables checking of patterns, such as shapes of front views etc., sizes, and colors of moving objects including four-wheel vehicles, two-wheel vehicles, and persons. The recognition dictionary storage unit 200 is, for example, a semiconductor memory device, such as a random access memory (RAM), a read only memory (ROM), or a flash memory, or a storage device, such as a hard disk, an optical disk, or an external storage device over a network.

Referring back to FIG. 3, the on-vehicle display controller 10 includes a storage 20 and a controller 30.

The storage 20 stores therein data needed for various processes performed in the on-vehicle display controller 10, and also stores therein results of the various processes. The storage 20 is, for example, a semiconductor memory device, such as a RAM, a ROM, or a flash memory, or a storage device, such as a hard disk, an optical disk, or an external storage device over a network. Alternatively, an external storage device wirelessly connected via a communication device (not illustrated) may be used.

The controller 30 is, for example, an arithmetic processing device configured by a central processing unit (CPU) or the like. The controller 30 includes the video data acquiring unit 31, a detecting unit 32, an identifying unit 33, a display video data generating unit 34, and the display controller 35. The controller 30 executes commands included in programs stored in the storage unit 20.

The video data acquiring unit 31 acquires video obtained by imaging the rear side of the vehicle 100. The video data acquiring unit 31 acquires the captured video data 110A output from the imager 2. The video data acquired by the video data acquiring unit 31 is, for example, video data including consecutive images at 60 frames per second. The video data acquiring unit 31 outputs the acquired captured video data 110A to the detecting unit 32.

The detecting unit 32 detects at least one following vehicles V in the captured video data 110A. The detecting unit 32 performs a vehicle recognition process on the captured video data 110A and detects the following vehicle V. More specifically, the detecting unit 32 performs pattern matching on the captured video data 110A using the recognition dictionary stored in the recognition dictionary storage unit 200, and detects the following vehicle V. The detecting unit 32 tracks the detected following vehicle V by image processing. The detecting unit 32 outputs detection results to the identifying unit 33.

The identifying unit 33 identifies a lower end portion B as a lower part of the following vehicle V that is detected by the detecting unit 32 in the captured video data 110A. More specifically, the identifying unit 33 identifies ground contact portions of front wheels of the following vehicle V in the captured video data 110A, or identifies a lower edge of a body of the following vehicle V in the captured video data 110A. In the first embodiment, the identifying unit 33 identifies the ground contact portions of the front wheels of the following vehicle V in the captured video data 110A. In the first embodiment, when the ground contact portions of the front wheels of the following vehicle V are not identified, the identifying unit 33 identifies the lower edge of the body of the following vehicle V in the captured video data 110A. The identifying unit 33 tracks the identified lower end portion B of the following vehicle V by image processing. The identifying unit 33 outputs processing results to the display video data generating unit 34.

In the first embodiment, an example will be described in which the lower end portion B of the following vehicle V is used as the lower part. The lower end portion B of the following vehicle V is a lower edge position of a shape of the following vehicle V detected by the detecting unit 32. For example, the lower end portion B of the following vehicle V is lower edges of wheels of the following vehicle V. The lower edges of the wheels of the following vehicle V are detected as a straight line. When the wheels or the lower edges of the wheels of the following vehicle V do not appear in the captured video data 110A or when the wheels or the lower edges of the wheels of the following vehicle V are not appropriately recognized by image processing, the lower edge of the body of the following vehicle V may be used as the lower end portion B of the following vehicle V, for example.

When the detecting unit 32 detects a plurality of following vehicles V in the captured video data 110A, the identifying unit 33 identifies the lower end portion B of the following vehicle V that meets a predetermined condition. In the first embodiment, the identifying unit 33 identifies the lower end portion B of the following vehicle V that is located at the shortest distance from the vehicle 100 in the captured video data 110A. Further, in the first embodiment, the identifying unit 33 identifies the lower end portion B of the following vehicle V that is located in the most central portion in the captured video data 110A. With this operation, the on-vehicle display system 1 can identify the lower end portion B of the following vehicle V that needs to be checked on a priority basis, such as the closest one, from among the plurality of detected following vehicles V.

When the detecting unit 32 detects a plurality of following vehicles V in the captured video data 110A, the identifying unit 33 adopts, as the following vehicle V located at the shortest distance from the vehicle 100, the following vehicle V whose ground contact position is located in the lowest part in the captured video data 110A among the plurality of the detected following vehicles V. Further, when the detecting unit 32 detects the plurality of the following vehicles V in the captured video data 110A, the identifying unit 33 adopts, as the following vehicle V located in the most central portion in the captured video data 110A, the following vehicle V whose position in the width direction is located in the most central portion in the captured video data 110A among the plurality of the detected following vehicles V. The identifying unit 33 may identify the following vehicle V that needs to be checked on a priority basis, based on a plurality of conditions as described above or based on conditions including a size of the following vehicle V in the width direction or the like.

The display video data generating unit 34 sets a clipping area of the captured video data 110A so as to include the lower end portion B of the following vehicle V identified by the identifying unit 33, and generates display video data 110B by performing clipping from the captured video data 110A. The display video data generating unit 34 outputs the clipped display video data 110B to the display controller 35.

More specifically, the display video data generating unit 34 determines whether the lower end portion B of the following vehicle V, which is identified by the identifying unit 33, is deviated from a first clipping area A1 (a clipping area set in advance) in the captured video data 110A. In other words, the display video data generating unit 34 determines whether the lower end portion B of the following vehicle V in the captured video data 110A is located outside the first clipping area A1. The first clipping area A1 is registered and stored in advance. In the first embodiment, it is assumed that the first clipping area A1 is a central portion of the captured video data 110A.

If the lower end portion B of the following vehicle V in the captured video data 110A is located inside the first clipping area A1 of the captured video data 110A, the display video data generating unit 34 determines that the lower end portion B is not deviated from the first clipping area A1. If it is determined that the lower end portion B of the following vehicle V is not deviated from the first clipping area A1, the display video data generating unit 34 sets the first clipping area A1 as the clipping area.

If the lower end portion B of the following vehicle V in the captured video data 110A is located outside the first clipping area A1 of the captured video data 110A, the display video data generating unit 34 determines that the lower end portion B is deviated from the first clipping area A1. If it is determined that the lower end portion B of the following vehicle V is deviated from the first clipping area A1, the display video data generating unit 34 sets a second clipping area A2, which includes the lower end portion B of the following vehicle V, as the clipping area. The second clipping area A2 is an area obtained by shifting the first clipping area A1 downward. In the first embodiment, the second clipping area A2 is set so as to include a predetermined number of pixels that are present below the lower end portion B of the vehicle. For example, the second clipping area A2 is set so as to include 50 pixels that are present below the lower end portion B of the following vehicle V. Alternatively, the second clipping area A2 may be set so as to include a road surface at the lower end portion B of the following vehicle V.

In this manner, the display video data generating unit 34 sets the clipping area of the captured video data 110A so as to include the lower end portion B of the following vehicle V identified by the identifying unit 33, and generates the display video data 110B by performing clipping from the captured video data 110A. The clipping area is the first clipping area A1 or the second clipping area A2.

The display video data generating unit 34 repeats the above-described process for every frame or for every certain number of frames.

The display controller 35 causes the rearview monitor 3 to display the display video data 110B generated by the display video data generating unit 34.

Figure 7:
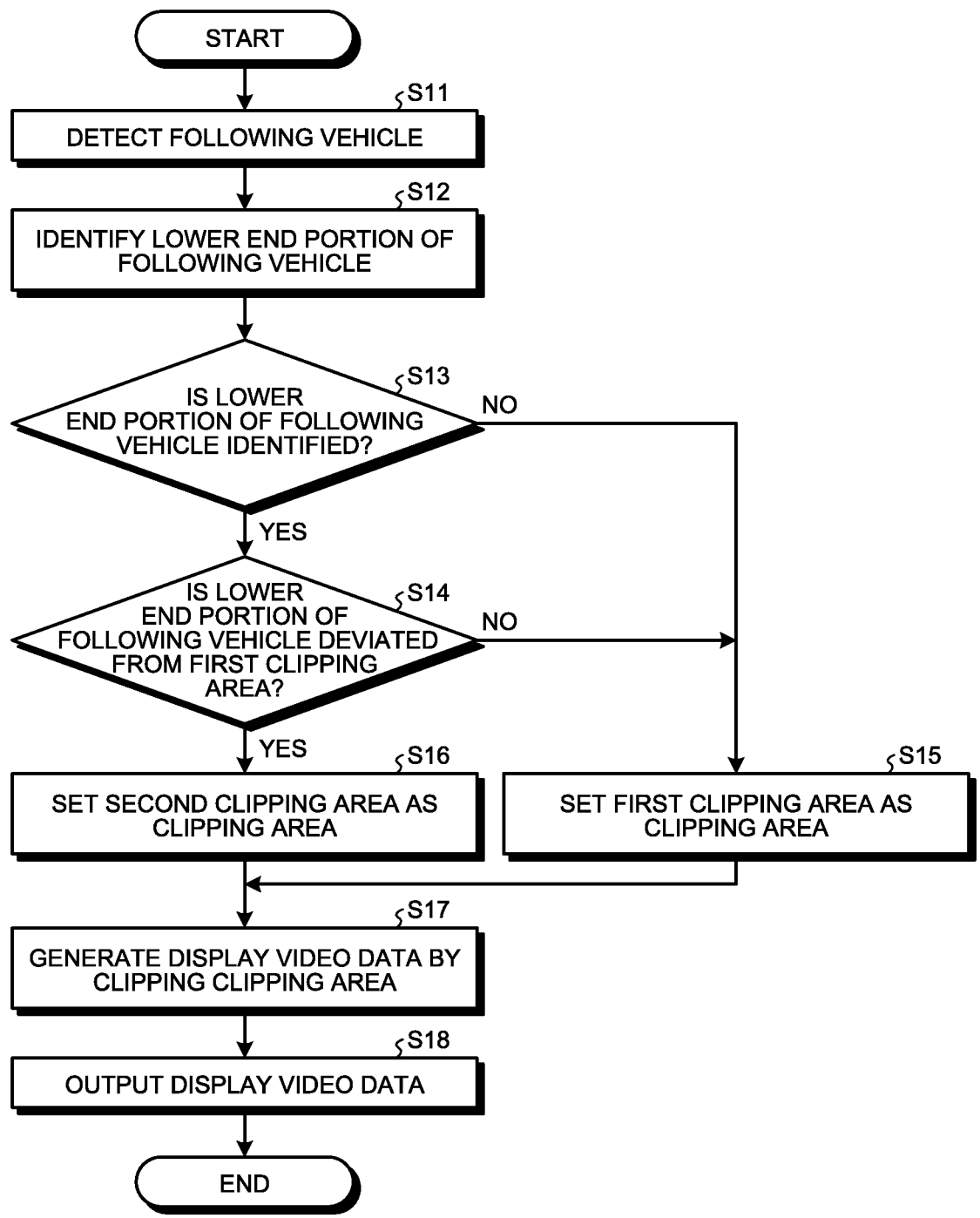
FIG. 7 is a flowchart illustrating a flow of a process performed by a controller of an on-vehicle display controller of the on-vehicle display system according to the first embodiment.

Next, a flow of a process performed by the controller 30 will be described with reference to FIG. 7. FIG. 7 is a flowchart illustrating a flow of the process performed by the controller 30 of the on-vehicle display controller 10 of the on-vehicle display system 1 according to the first embodiment.

The controller 30 detects the following vehicle V in the captured video data 110A (Step S11). More specifically, the controller 30 causes the detecting unit 32 to detect the following vehicle V in the captured video data 110A.

The controller 30 identifies the lower end portion B of the following vehicle V in the captured video data 110A (Step S12). More specifically, the controller 30 causes the identifying unit 33 to identify the lower end portion B of the following vehicle V that is detected by the detecting unit 32 in the captured video data 110A.

The controller 30 determines whether the lower end portion B of the following vehicle V is identified (Step S13). More specifically, the controller 30 causes the identifying unit 33 to determine whether the lower end portion B of the following vehicle V is identified in the captured video data 110A. In other words, the controller 30 causes the identifying unit 33 to determine whether the lower end portion B of the following vehicle V is included in the captured video data 110A. If the identifying unit 33 determines that the lower end portion B of the following vehicle V is not identified (NO at Step S13), the controller 30 proceeds to Step S15. If the identifying unit 33 determines that the lower end portion B of the following vehicle V is identified (YES at Step S13), the controller 30 proceeds to Step S14.

The controller 30 determines whether the lower end portion B of the following vehicle V is deviated from the first clipping area A1 (Step S14). More specifically, the controller 30 causes the display video data generating unit 34 to determine whether the lower end portion B of the following vehicle V is deviated from the first clipping area A1 in the captured video data 110A. If the display video data generating unit 34 determines that the lower end portion B of the following vehicle V is not deviated from the first clipping area A1 (NO at Step S14), the controller 30 proceeds to Step S15. If the display video data generating unit 34 determines that the lower end portion B of the following vehicle V is deviated from the first clipping area A1 (YES at Step S14), the controller 30 proceeds to Step S16.

The controller 30 sets the first clipping area A1 as the clipping area (Step S15). More specifically, the controller 30 causes the display video data generating unit 34 to set the first clipping area A1 as the clipping area.

The controller 30 sets the second clipping area A2 as the clipping area (Step S16). More specifically, the controller 30 causes the display video data generating unit 34 to set the second clipping area A2. The second clipping area A2 is an area that includes a predetermined number of pixels that are present below the lower end portion B of the following vehicle V.

The controller 30 generates the display video data 110B by clipping the clipping area (Step S17). More specifically, the controller 30 causes the display video data generating unit 34 to generate the display video data 110B by clipping the clipping area.

The controller 30 outputs the display video data 110B (Step S18). More specifically, the controller 30 causes the display controller 35 to cause the rearview monitor 3 to display the display video data 110B.

Figure 8:
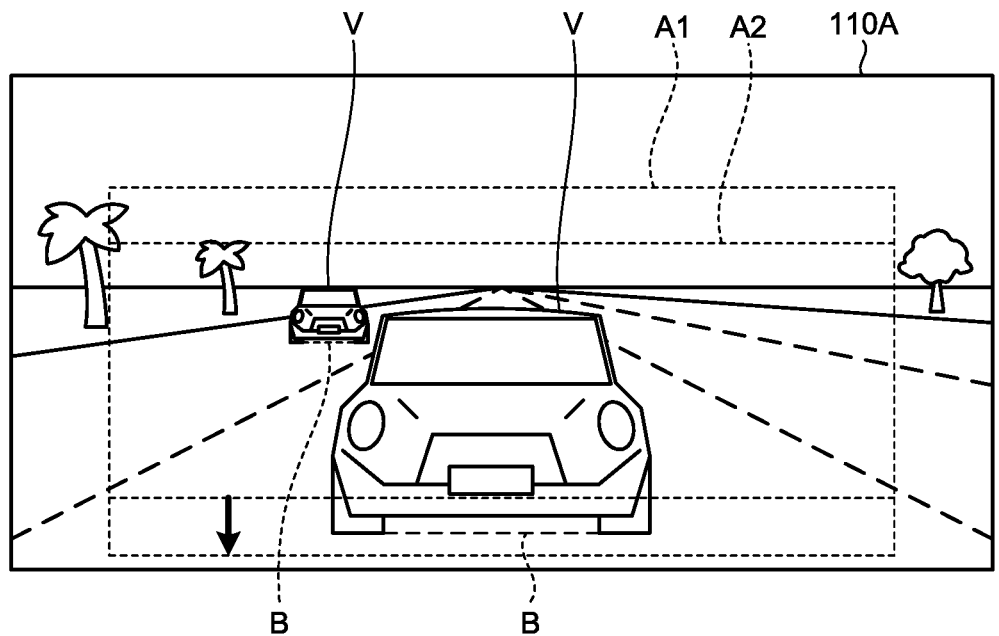
FIG. 8 is a diagram illustrating another example of captured video data obtained through imaging by the imager of the on-vehicle display system according to the first embodiment.

With reference to FIG. 4 and FIG. 8, a detailed example of the process performed by the controller 30 will be described. FIG. 8 is a diagram illustrating another example of the captured video data obtained through imaging by the imager 2 of the on-vehicle display system 1 according to the first embodiment.

In the case of the captured video data 110A illustrated in FIG. 4, both of the lower end portions B of the two following vehicles V that appear in the captured video data 110A are located inside the first clipping area A1. The following vehicle V that appears in the center of the captured video data 110A illustrated in FIG. 4 is located at a backward position separated by about 30 m. At Step S14, the controller 30 determines that the lower end portion B of the following vehicle V is not deviated from the first clipping area A1 (NO at Step S14). At Step S15, the controller 30 sets the first clipping area A1 as the clipping area. At Step S17, the controller 30 generates the display video data 110B by clipping the first clipping area A1. At Step S18, the controller 30 causes the rearview monitor 3 to display the display video data 110B illustrated in FIG. 5.

In the case of the captured video data 110A illustrated in FIG. 8, the lower end portion B of the following vehicle V located in the center among the two following vehicles V that appear in the captured video data 110A is deviated from the first clipping area A1. The following vehicle V that appears in the center of the captured video data 110A illustrated in FIG. 8 is located at a backward position separated by about 10 m. At Step S14, the controller 30 determines that the lower end portion B of the following vehicle V is deviated from the first clipping area A1 (YES at Step S14). At Step S16, the controller 30 sets the second clipping area A2 as the clipping area. At Step S17, the controller 30 generates the display video data 110B by clipping the second clipping area A2. At Step S18, the controller 30 causes the rearview monitor 3 to display the display video data 110B illustrated in FIG. 9.

Figure 9:
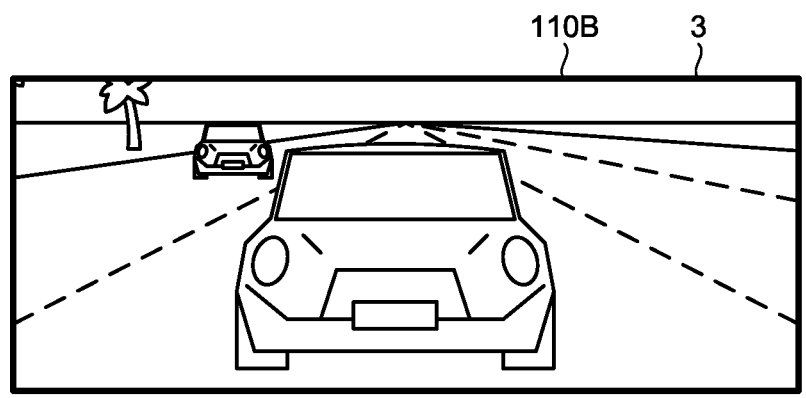
FIG. 9 is a diagram illustrating another example of video displayed on the rearview monitor of the on-vehicle display system according to the first embodiment.

Specifically, as illustrated in FIG. 9, the controller 30 clips an area including the lower end portion B of the following vehicle V and displays the area on a display surface of the rearview monitor 3. FIG. 9 is a diagram illustrating another example of video displayed on the rearview monitor 3 of the on-vehicle display system 1 according to the first embodiment. Specifically, an area that is shifted downward so as to include the lower end portion B of the following vehicle V is clipped as the display video data 110B.

In this manner, if the controller 30 determines that the lower end portion B of the following vehicle V is deviated from the first clipping area A1, the on-vehicle display system 1 causes the rearview monitor 3 to display the display video data 110B that is generated by clipping the second clipping area A2 that is obtained by shifting the first clipping area A1 downward. In other words, if the controller 30 determines that the lower end portion B of the following vehicle V is deviated from the first clipping area A1, the on-vehicle display system 1 displays the display video data 110B including the lower end portion B of the following vehicle V.

As described above, according to the first embodiment, if it is determined that the lower end portion B of the following vehicle V is deviated from the first clipping area A1, it is possible to cause the rearview monitor 3 to display the display video data 110B that is generated by clipping the second clipping area A2 that is obtained by shifting the first clipping area A1 downward. In other words, if the controller 30 determines that the lower end portion B of the following vehicle V is deviated from the first clipping area A1, the on-vehicle display system 1 can display the display video data 110B including the lower end portion B of the following vehicle V.

In this manner, according to the first embodiment, the lower end portion B of the following vehicle V is displayed on the display surface of the rearview monitor 3. Further, according to the first embodiment, the lower end portion B of the following vehicle V and a road surface under the following vehicle V are displayed on the display surface of the rearview monitor 3. Therefore, in the first embodiment, a driver can accurately recognize a distance to the following vehicle V according to a relative relationship with the following vehicle V while considering a positional relationship between the lower end portion B of the following vehicle V and the road surface integrally.

As described above, according to the first embodiment, it is possible to accurately recognize a distance to the following vehicle V even with use of an electronic rearview mirror that displays a real image.

Figure 10:
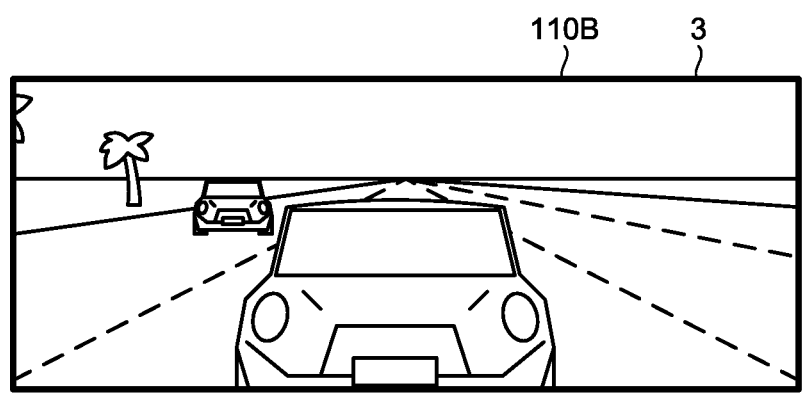
FIG. 10 is a diagram illustrating an example of video displayed on the rearview monitor.

As an opposite example, a case will be described in which the first clipping area A1 is adopted as the clipping area in the captured video data 110A illustrated in FIG. 8. In this case, the first clipping area A1 is clipped from the captured video data 110A, and the display video data 110B as illustrated in FIG. 10 is displayed on the display surface of the rearview monitor 3. FIG. 10 is a diagram illustrating an example of video displayed on the rearview monitor 3. In the display video data 110B illustrated in FIG. 10, the lower end portion B of the following vehicle V is not displayed on the display surface of the rearview monitor 3. Therefore, it is impossible for a driver to compare the lower end portion B of the following vehicle V and a road surface that is adopted as a comparison target, thus it is difficult for the driver to accurately recognize a distance to the following vehicle V.

Second Embodiment

Figure 11:
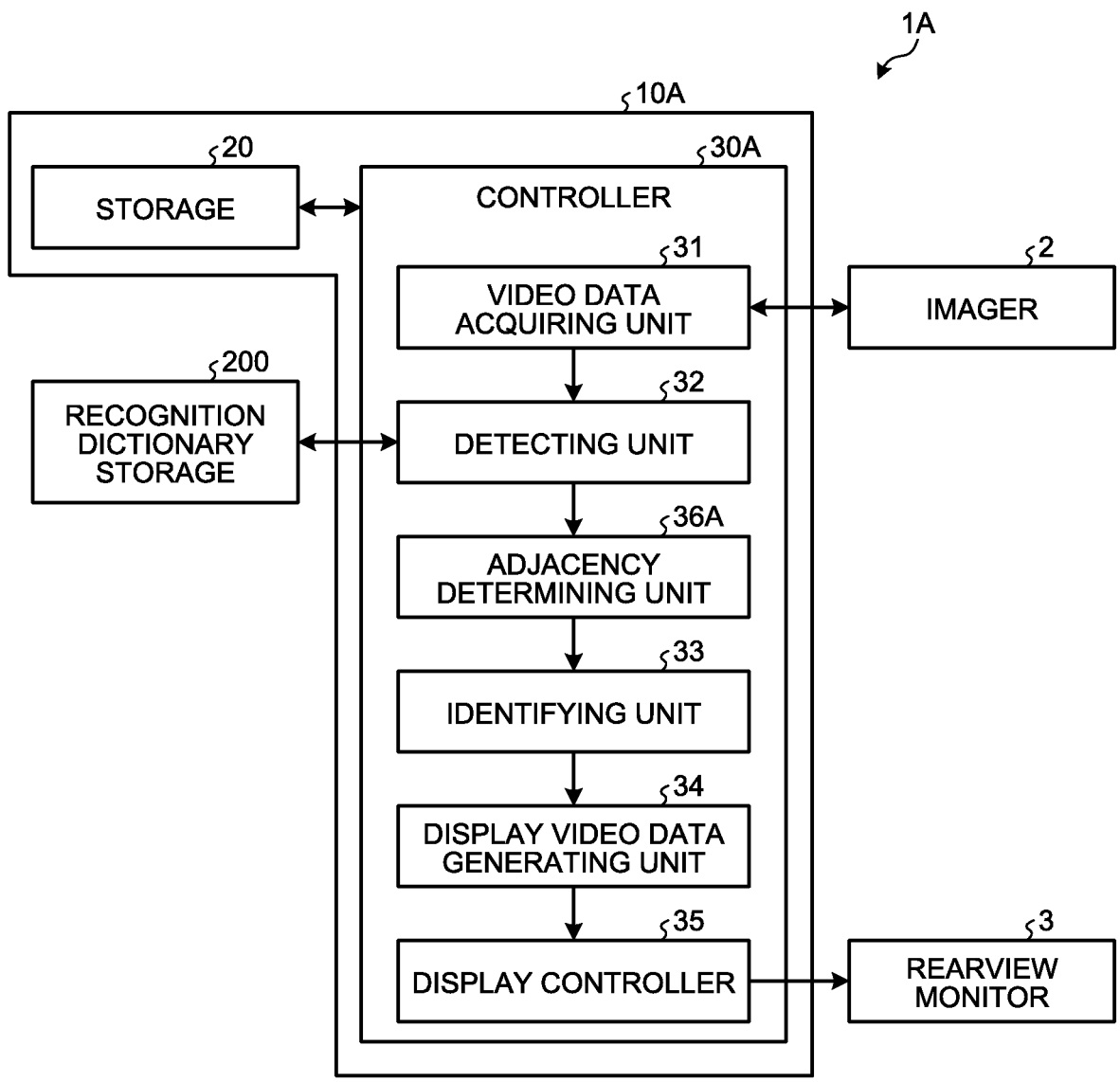
FIG. 11 is a block diagram illustrating a configuration example of an on-vehicle display system according to a second embodiment.
Figure 12:
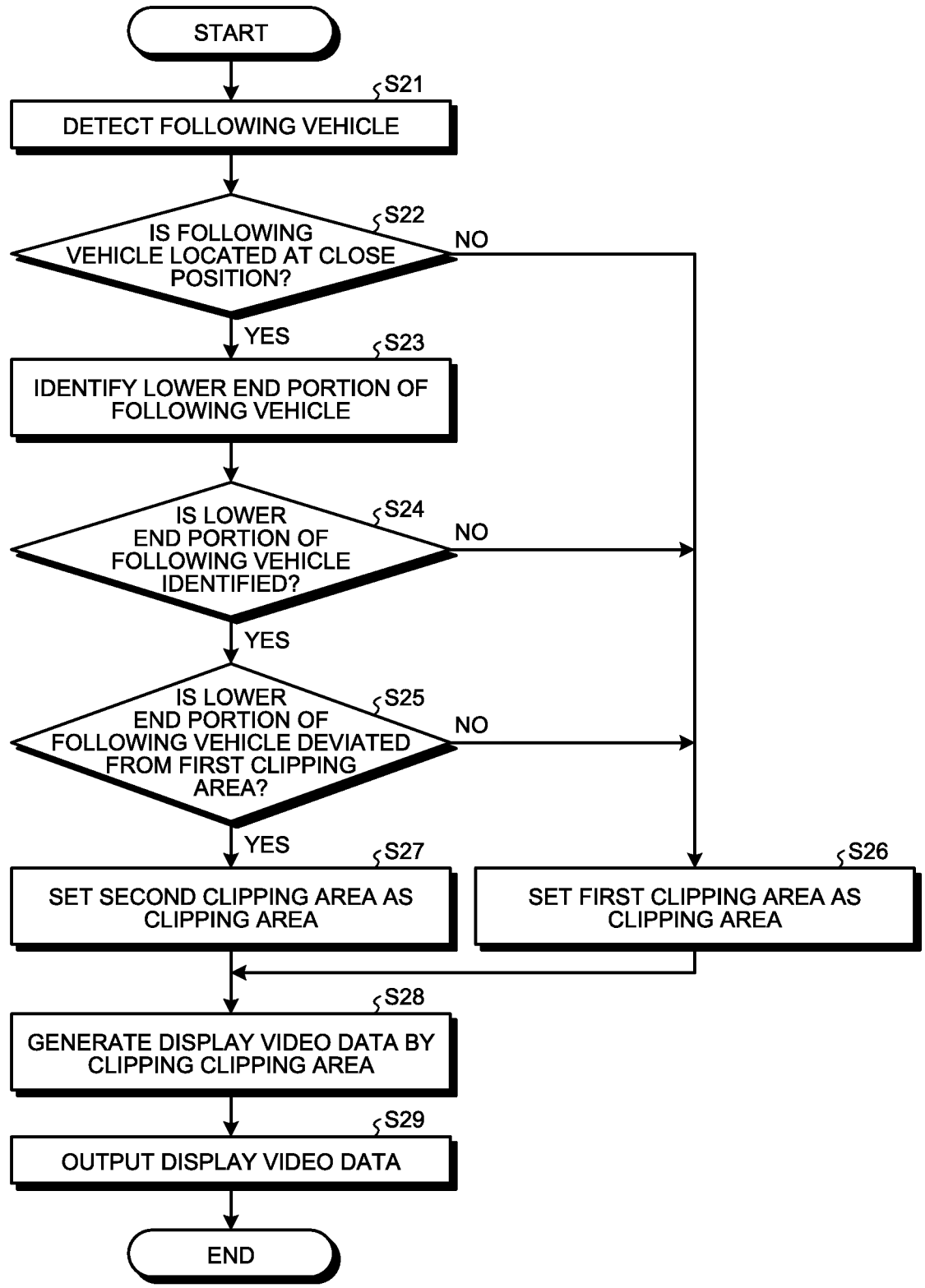
FIG. 12 is a flowchart illustrating a flow of a process performed by a controller of an on-vehicle display controller of the on-vehicle display system according to the second embodiment.

With reference to FIG. 11 and FIG. 12, an on-vehicle display system 1A according to a second embodiment will be described. FIG. 11 is a block diagram illustrating a configuration example of the on-vehicle display system 1A according to the second embodiment. FIG. 12 is a flowchart illustrating a flow of a process performed by a controller 30A of an on-vehicle display controller 10A of the on-vehicle display system 1A according to the second embodiment. A basic configuration of the on-vehicle display system 1A is the same as the on-vehicle display system 1 of the first embodiment. In the following description, the same components as those of the on-vehicle display system 1 are denoted by the same or corresponding reference signs, and detailed explanation thereof will be omitted.

The on-vehicle display system 1A of the second embodiment is different from the on-vehicle display system 1 of the first embodiment in that it further includes an adjacency determining unit 36A in addition to the components of the on-vehicle display system 1 of the first embodiment.

A controller 30A includes the video data acquiring unit 31, the detecting unit 32, the identifying unit 33, the display video data generating unit 34, the display controller 35, and the adjacency determining unit 36A.

The adjacency determining unit 36A determines that the following vehicle V detected by the detecting unit 32 is located close to the vehicle 100. For example, when a size of the detected following vehicle V in a vehicle-width direction is equal to or larger than a predetermined percent of a size of the captured video data 110A in a width direction, or when the number of pixels of the following vehicle V in the vehicle-width direction is equal to or larger than a predetermined percent of the number of pixels of the captured video data 110A in the width direction, the adjacency determining unit 36A determines that the following vehicle V is located close to the vehicle 100. The predetermined percent used to determine that the following vehicle V is located close to the vehicle 100 may be changed depending on a type of the following vehicle V. The adjacency determining unit 36A outputs determination results to the identifying unit 33.

Alternatively, for example, when a distance between the vehicle 100 and the following vehicle V is equal to or shorter than a predetermined distance, the adjacency determining unit 36A may determine that the following vehicle V is located close to the vehicle 100. The distance between the vehicle 100 and the following vehicle V can be obtained by identifying a ground contact position that is based on the contour of the detected following vehicle V when the detecting unit 32 detects the following vehicle V in the captured video data 110A, and then using a positional relationship of the ground contact position in the captured video data 110A. Alternatively, the distance between the vehicle 100 and the following vehicle V can be calculated based on a size of an image of the following vehicle V that appears in the captured video data 110A and a size of the following vehicle V that is stored in the recognition dictionary storage unit 200. Further, the adjacency determining unit 36A may determine that the following vehicle V is located close to the vehicle 100 by using a distance between the vehicle 100 and the following vehicle V that is measured by radar or the like (not illustrated).

While the adjacency determining unit 36A determines whether the distance between the vehicle 100 and the following vehicle V is short, it may be possible to determine whether the following vehicle V is approaching the vehicle 100. For example, when the size of the detected following vehicle V in the vehicle-width direction has increased with each imaging frame of the captured video data 110A, and if the size becomes equal to or larger than a predetermined percent of the size of the captured video data 110A in the width direction, or if the number of pixels of the following vehicle V in the vehicle-width direction becomes equal to or larger than a predetermined percent of the number of pixels of the captured video data 110A in the width direction, the adjacency determining unit 36A determines that the following vehicle V is approaching the vehicle 100. Further, the adjacency determining unit 36A may determine that the following vehicle V is approaching the vehicle 100 by using a distance between the vehicle 100 and the following vehicle V that is measured by radar or the like (not illustrated).

Next, with reference to FIG. 12, a flow of a process performed by the controller 30A will be described. The processes at Step S21 and Step S23 to Step S29 are the same as the processes at Step S11 to Step S18 in the flowchart illustrated in FIG. 7.

The controller 30A determines whether the following vehicle V in the captured video data 110A is located at a close position (Step S22). More specifically, when the adjacency determining unit 36A determines that the size of the detected following vehicle V in the vehicle-width direction is equal to or larger than a predetermined percent of the size of the captured video data 110A in the width direction, or when the number of pixels of the following vehicle V in the vehicle-width direction is equal to or larger than a predetermined percent of the number of pixels of the captured video data 110A in the width direction, the controller 30A determines that the following vehicle V is located close to the vehicle 100. Alternatively, for example, when the adjacency determining unit 36A determines that the distance between the vehicle 100 and the following vehicle V is equal to or shorter than a predetermined distance, the controller 30A determines that the following vehicle V is located close to the vehicle 100. If it is determined that the following vehicle V in the captured video data 110A is located at the close position (YES at Step S22), the controller 30A proceeds to Step S23. If it is determined that the following vehicle V in the captured video data 110A is not located at the close position (NO at Step S22), the controller 30A proceeds to Step S26. In the process at Step S22, it may be possible to determine whether the following vehicle V is approaching, instead of determining whether the following vehicle V is located at the close position.

With this configuration, when the controller 30A determines that the following vehicle V is located at the close position, the on-vehicle display system 1A causes the controller 30A to determine whether the lower end portion B of the following vehicle V is deviated from the first clipping area A1.

As described above, according to the second embodiment, when it is determined that the following vehicle V is located at the close position, it is possible to determine whether the lower end portion B of the following vehicle V is deviated from the first clipping area A1. Therefore, according to the second embodiment, it is possible to reduce load on the process performed by the controller 30A.

Third Embodiment

Figure 13:
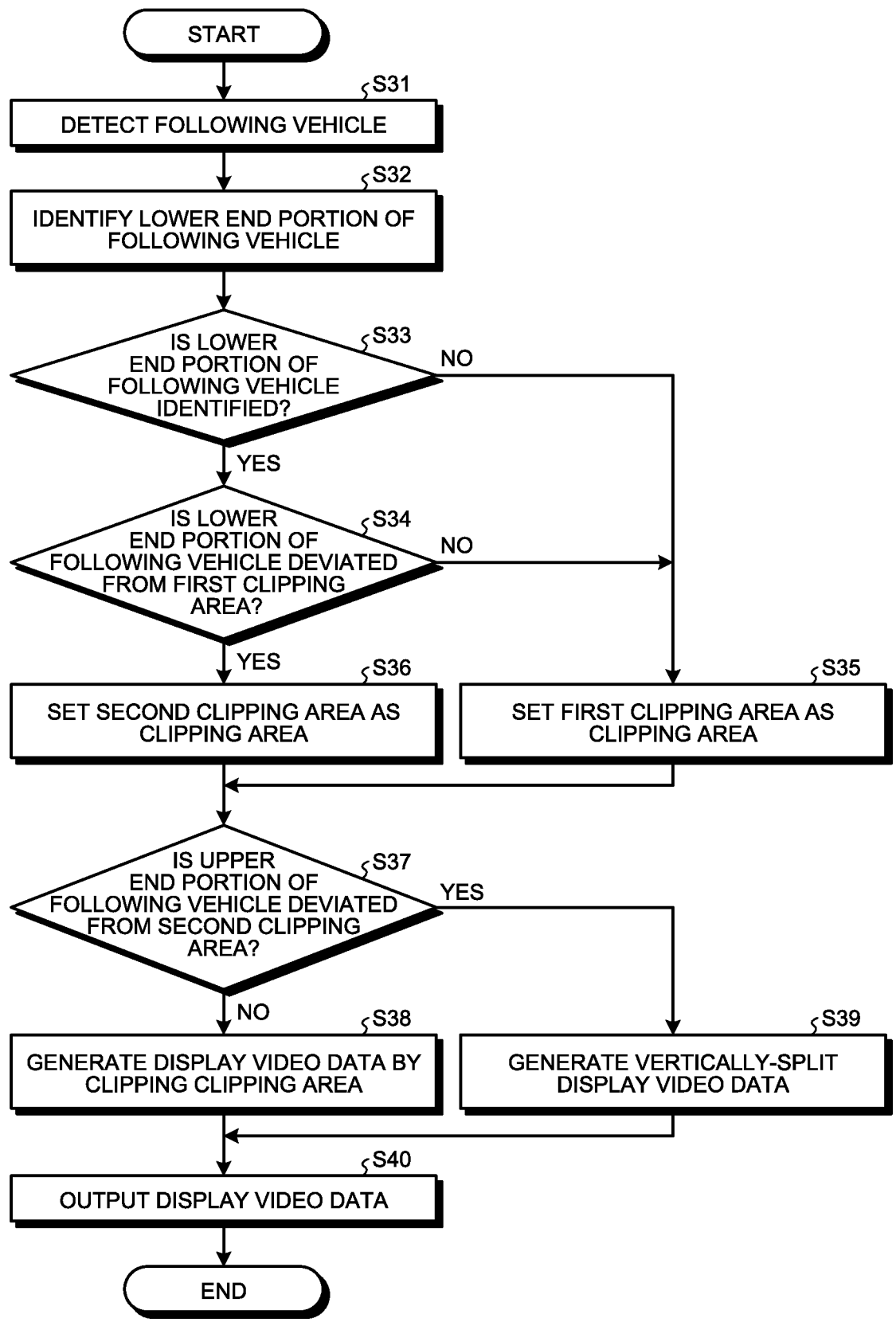
FIG. 13 is a flowchart illustrating a flow of a process performed by a controller of an on-vehicle display controller of an on-vehicle display system according to a third embodiment.
Figure 14:
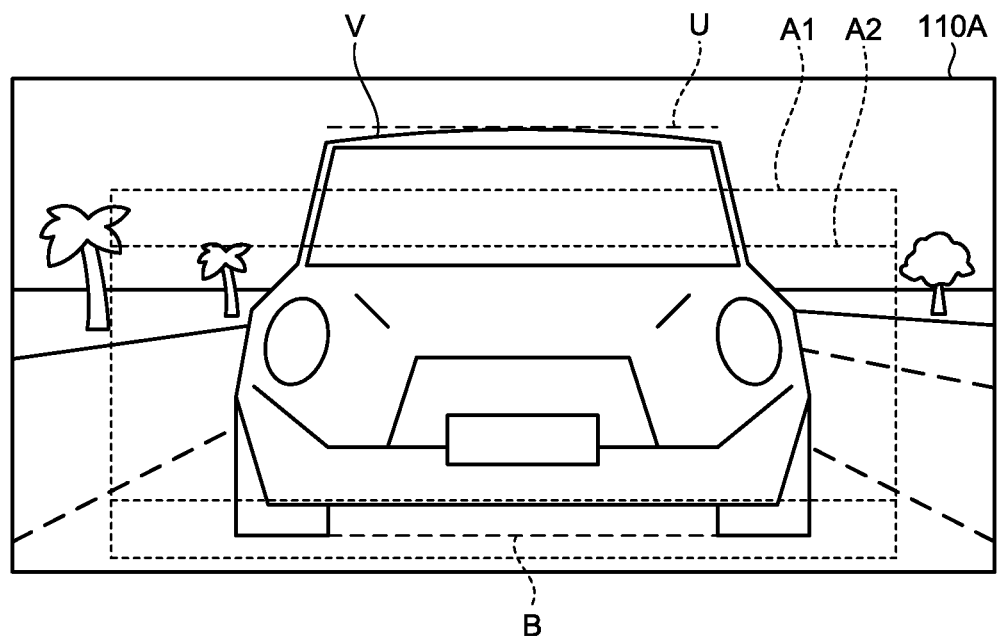
FIG. 14 is a diagram illustrating an example of captured video data obtained through imaging by an imager of the on-vehicle display system according to the third embodiment.
Figure 15:
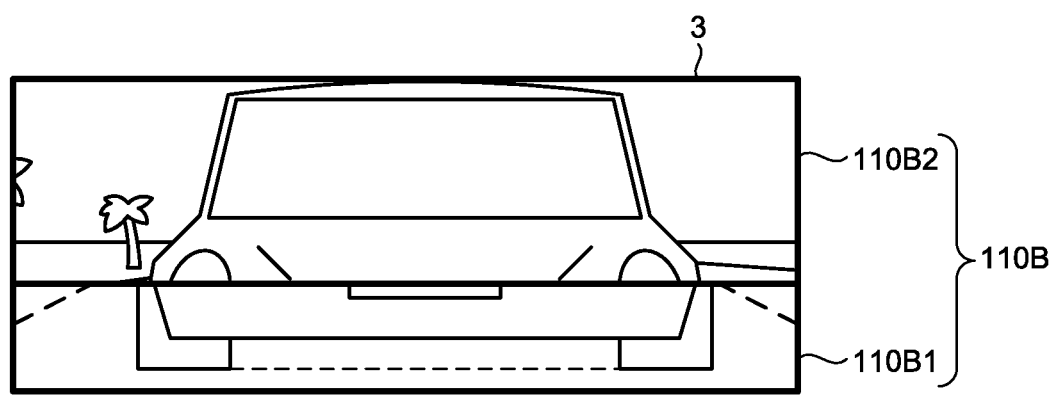
FIG. 15 is a diagram illustrating an example of video displayed on a rearview monitor of the on-vehicle display system according to the third embodiment.
Figure 16:
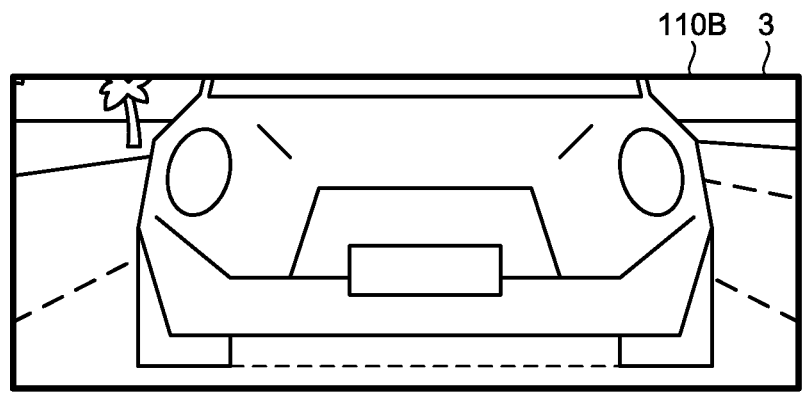
FIG. 16 is a diagram illustrating another example of video displayed on the rearview monitor of the on-vehicle display system according to the third embodiment.

With reference to FIG. 13 to FIG. 16, an on-vehicle display system 1 according to a third embodiment will be described. FIG. 13 is a flowchart illustrating a flow of a process performed by a controller of an on-vehicle display controller of the on-vehicle display system according to the third embodiment. FIG. 14 is a diagram illustrating an example of captured video data obtained through imaging by an imager of the on-vehicle display system according to the third embodiment. FIG. 15 is a diagram illustrating an example of video displayed on a rearview monitor of the on-vehicle display system according to the third embodiment. FIG. 16 is a diagram illustrating another example of video displayed on the rearview monitor of the on-vehicle display system according to the third embodiment.

In the on-vehicle display system 1 according to the third embodiment, the controller 30 performs a process different from the process of the first embodiment.

When it is determined that an upper end portion U of the following vehicle V identified by the identifying unit 33 is deviated from the second clipping area A2 of the captured video data 110A, the display video data generating unit 34 generates vertically-split display video data 110B. The vertically-split display video data 110B is video in which lower video 110B1 that includes the lower end portion B of the following vehicle V and upper video 110B2 that includes the upper end portion U of the following vehicle V are synthesized. The lower video 110B1 is video obtained by clipping the second clipping area A2 that includes the lower end portion B of the following vehicle V. The upper video 110B2 is video obtained by clipping an area including a predetermined number of pixels that are present above the upper end portion U of the following vehicle V. A ratio between the lower video 110B1 and the upper video 110B2 in the display video data 110B is set in advance. In the third embodiment, for example, the ratio between the lower video 110B1 and the upper video 110B2 is 1:2. In other words, in the third embodiment, a lower one-third of the display video data 110B corresponds to the lower video 110B1, and upper two-thirds of the display video data 110B correspond to the upper video 110B2.

Next, with reference to FIG. 13, a flow of a process performed by the controller 30 will be described. The processes at Step S31 to Step S36, Step S38, and Step S40 are the same as the processes at Step S11 to Step S18 in the flowchart illustrated in FIG. 7.

The controller 30 determines whether the upper end portion U of the following vehicle V is deviated from the second clipping area A2 (Step S37). More specifically, the controller 30 causes the display video data generating unit 34 to determine whether the upper end portion U of the following vehicle V is deviated from the second clipping area A2 in the captured video data 110A. If the display video data generating unit 34 determines that the upper end portion U of the following vehicle V is not deviated from the second clipping area A2 (NO at Step S37), the controller 30 proceeds to Step S38. If it is determined that the upper end portion U of the following vehicle V is deviated from the second clipping area A2 (YES at Step S37), the controller 30 proceeds to Step S39.

The controller 30 generates the vertically-split display video data 110B (Step S39). More specifically, the controller 30 causes the display video data generating unit 34 to generate the display video data 110B, in which the lower video 110B1 that includes the lower end portion B of the following vehicle V and the upper video 110B2 that includes the upper end portion U of the following vehicle V are synthesized. In the display video data 110B, the lower part corresponds to the lower video 110B1 and the upper part corresponds to the upper video 110B2.

With reference to FIG. 14 to FIG. 16, a detailed example of the process performed by the controller 30 will be described.

In the case of the captured video data 110A illustrated in FIG. 14, the lower end portion B of the following vehicle V that appears in the captured video data 110A is deviated from the first clipping area A1. The upper end portion U of the following vehicle V that appears in the captured video data 110A illustrated in FIG. 14 is deviated from the second clipping area A2. The following vehicle V that appears in the captured video data 110A illustrated in FIG. 14 is located at a backward position separated by about 5 m to 10 m. At Step S34, the controller 30 determines that the lower end portion B of the following vehicle V is deviated from the first clipping area A1 (YES at Step S34). At Step S36, the controller 30 sets the second clipping area A2 as the clipping area. At Step S37, the controller 30 determines that the upper end portion U of the following vehicle V is deviated from the second clipping area A2 (YES at Step S37). At Step S39, the controller 30 generates the vertically-split display video data 110B. At Step S40, the controller 30 causes the rearview monitor 3 to display the display video data 110B illustrated in FIG. 15.

As described above, according to the third embodiment, the vertically-split display video data 110B is generated so as to include the lower end portion B and the upper end portion U of the following vehicle V identified by the identifying unit 33 as illustrated in FIG. 15. In this manner, according to the third embodiment, it is possible to display the vertically-split display video data 110B including the lower end portion B and the upper end portion U of the following vehicle V on the display surface of the rearview monitor 3. Therefore, according to the third embodiment, a driver can accurately recognize a distance to the following vehicle V according to a relative relationship with the following vehicle V while considering the lower end portion B of the following vehicle V and information on the size of a surrounding object that is adopted as a comparison target, such as a white line drawn on the road surface, integrally. Further, according to the third embodiment, since the interior of the following vehicle V appears in the display video data 110B illustrated in FIG. 15, is possible to view a driver of the following vehicle V.

In contrast, in the first embodiment, when the captured video data 110A illustrated in FIG. 14 is used, the display video data 110B as illustrated in FIG. 16 is displayed. Therefore, the display video data 110B does not include the upper end portion U of the following vehicle V, and it is difficult for the driver to accurately recognize a distance to the following vehicle V. Further, because the upper end portion U is not included, it is difficult to view the driver of the following vehicle V.

Fourth Embodiment

Figure 17:
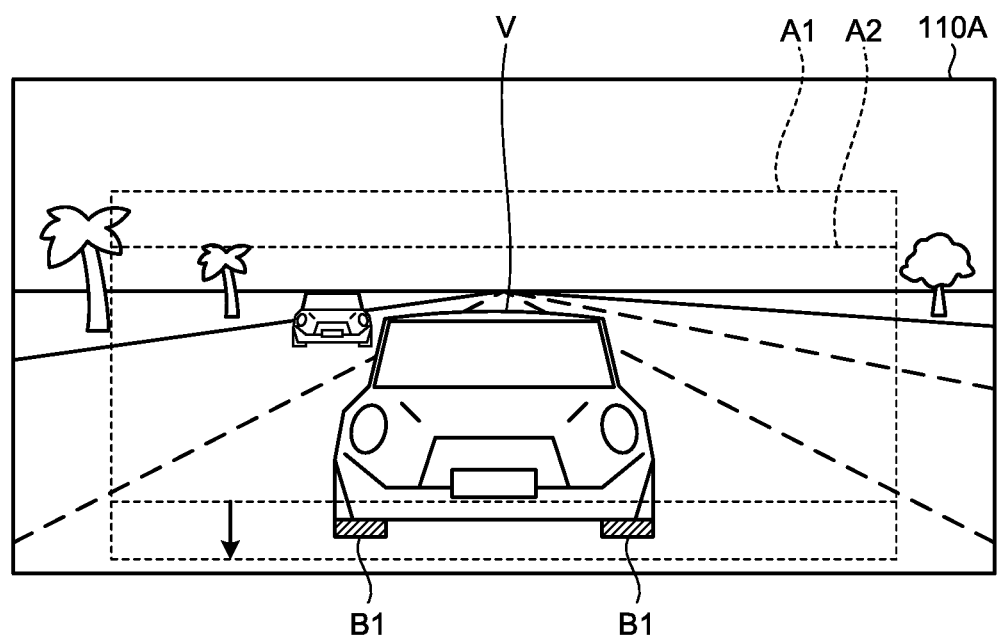
FIG. 17 is a diagram illustrating an example of captured video data obtained through imaging by an imager of an on-vehicle display system according to a fourth embodiment.
Figure 18:
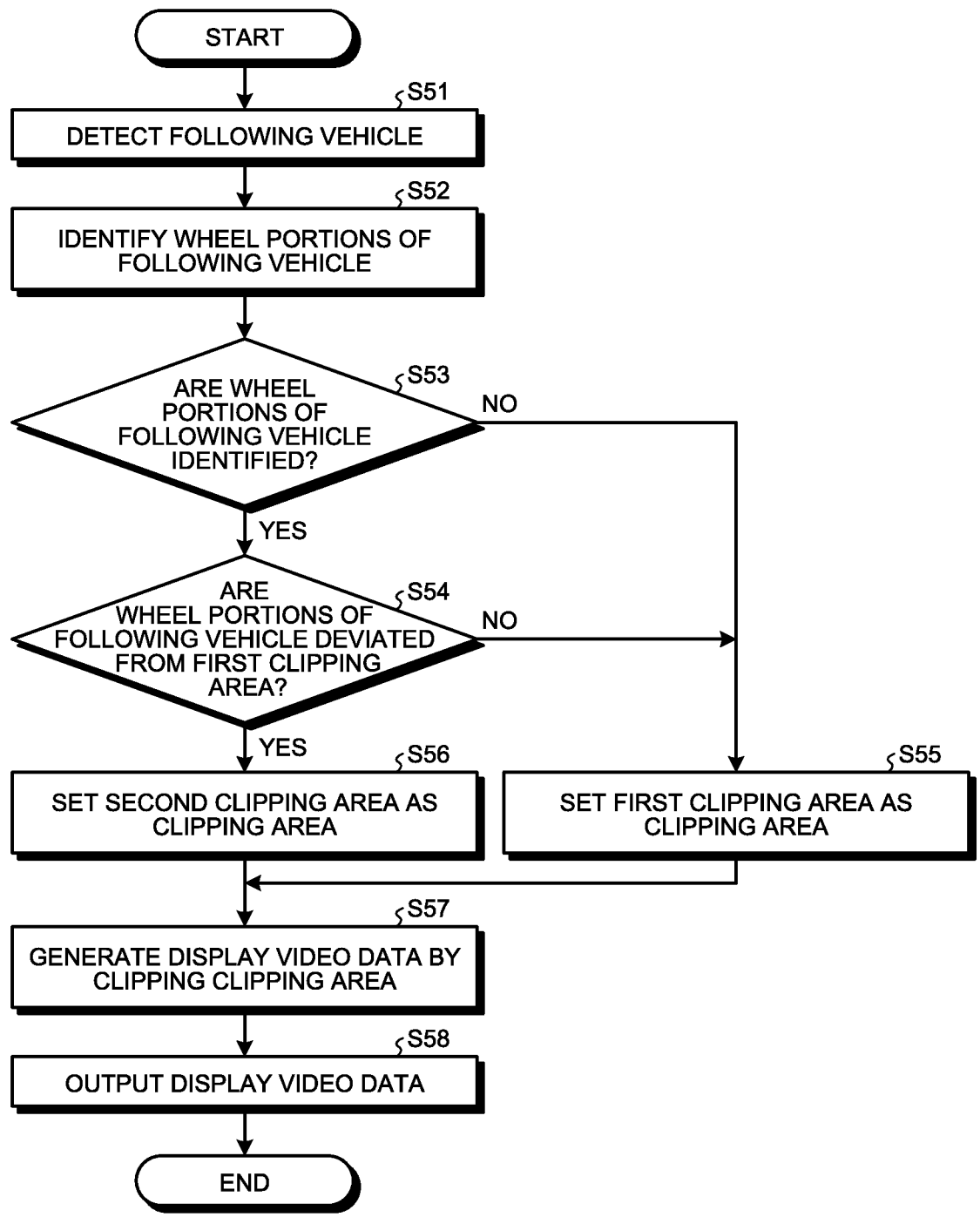
FIG. 18 is a flowchart illustrating an example of a flow of a process performed by a controller of an on-vehicle display controller of the on-vehicle display system according to the fourth embodiment.
Figure 19:
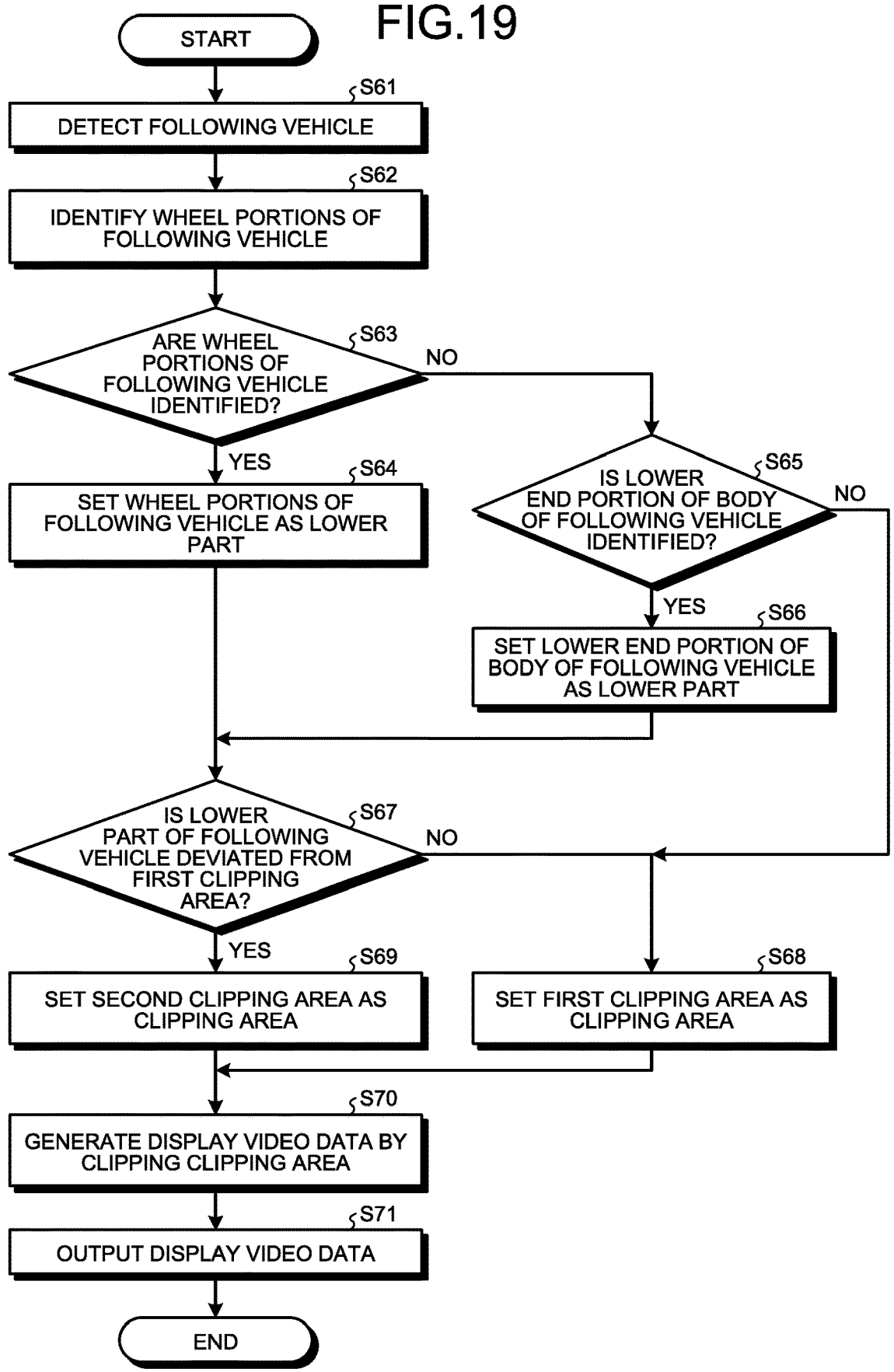
FIG. 19 is a flowchart of illustrating another example of a flow of the process performed by the controller of the on-vehicle display controller of the on-vehicle display system according to the fourth embodiment.

With reference to FIG. 17 to FIG. 19, the on-vehicle display system 1 according to a fourth embodiment will be described. FIG. 17 is a diagram illustrating an example of captured video data obtained through imaging by an imager of the on-vehicle display system according to the fourth embodiment. FIG. 18 is a flowchart illustrating a flow of a process performed by a controller of an on-vehicle display controller of the on-vehicle display system according to the fourth embodiment. FIG. 19 is a flowchart illustrating another example of the flow of the process performed by the controller of the on-vehicle display controller of the on-vehicle display system according to the fourth embodiment.

The on-vehicle display system 1 according to the fourth embodiment is different from that of the first embodiment in that wheel portions B1 of the following vehicle V are identified as a lower part of the vehicle.

The identifying unit 33 identifies the wheel portions B1 of the following vehicle V as the lower part of the following vehicle V that is detected by the detecting unit 32 in the captured video data 110A. More specifically, the identifying unit 33 identifies the wheel portions B1 of the following vehicle V in the captured video data 110A. The wheel portions B1 are portions that are recognized as wheels by performing an image recognition process on the captured video data 110A. The wheel portions B1 are detected as planes with certain areas. In FIG. 17, the wheel portions are areas indicated by oblique lines. In the fourth embodiment, the identifying unit 33 identifies front wheels of the following vehicle V in the captured video data 110A.

When it is impossible to identify the ground contact portions of the front wheels of the following vehicle V, the identifying unit 33 may identify the lower end portion of the body of the following vehicle V in the captured video data 110A.

The display video data generating unit 34 sets a clipping area of the captured video data 110A so as to include the wheel portions B1 of the following vehicle V identified by the identifying unit 33, and generates the display video data 110B by performing clipping from the captured video data 110A.

If the wheel portions B1 of the following vehicle V in the captured video data 110A is located outside the first clipping area A1 in the captured video data 110A, the display video data generating unit 34 determines that the wheel portions B1 are deviated from the first clipping area A1. If it is determined that the wheel portions B1 of the following vehicle V are deviated from the first clipping area A1, the display video data generating unit 34 sets, as the clipping area, the second clipping area A2 that includes the wheel portions B1 of the following vehicle V. Alternatively, the second clipping area A2 may be set so as to include a road surface on which the wheel portions B1 of the following vehicle V are grounded.

Next, with reference to FIG. 18, a flow of a process performed by the controller 30 will be described. The processes at Step S51 and Step S55 to S58 are the same as the processes at Step S11 and Step S15 to Step S18 in the flowchart illustrated in FIG. 7.

The controller 30 identifies the wheel portions B1 of the following vehicle V in the captured video data 110A (Step S52). More specifically, the controller 30 causes the identifying unit 33 to identify, in the captured video data 110A, the wheel portions B1 of the following vehicle V detected by the detecting unit 32.

The controller 30 determines whether the wheel portions B1 of the following vehicle V are identified (Step S53). The controller 30 causes the identifying unit 33 to identify whether the captured video data 110A includes the wheel portions B1 of the following vehicle V. If the identifying unit 33 determines that the wheel portions B1 of the following vehicle V are not identified (NO at Step S53), the controller 30 proceeds to Step S55. If the identifying unit 33 determines that the wheel portions B1 of the following vehicle V are identified (YES at Step S53), the controller 30 proceeds to Step S54.

The controller 30 determines whether the wheel portions B1 of the following vehicle V are deviated from the first clipping area A1 (Step S54). If the display video data generating unit 34 determines that the wheel portions B1 of the following vehicle V are not deviated from the first clipping area A1 (NO at Step S54), the controller 30 proceeds to Step S55. If the display video data generating unit 34 determines that the wheel portions B1 of the following vehicle V are deviated from the first clipping area A1 (YES at Step S54), the controller 30 proceeds to Step S56.

Alternatively, the controller 30 may perform a process as illustrated in FIG. 19. The processes from Step S61 to Step S63 and Step S68 to Step S71 are the same as the processes from Step S51 to Step S53 and Step S55 to Step S58 in the flowchart illustrated in FIG. 18.

If the wheel portions B1 of the following vehicle V are identified (YES at Step S63), the controller 30 sets the wheel portions B1 of the following vehicle V as a lower part (Step S64).

If the wheel portions B1 of the following vehicle V are not identified (NO at Step S63), the controller 30 determines whether the lower end portion of the body of the following vehicle V is identified (Step S65). The controller 30 causes the identifying unit 33 to determine whether the captured video data 110A includes the lower end portion of the body of the following vehicle V. If the identifying unit 33 determines that the lower end portion of the body of the following vehicle V is not identified (NO at Step S65), the controller 30 proceeds to Step S68. If the identifying unit 33 determines that the lower end portion of the body of the following vehicle V is identified (YES at Step S65), the controller 30 proceeds to Step S66.

If the lower end portion of the body of the following vehicle V is identified (YES at Step S65), the controller 30 sets the lower end portion of the body of the following vehicle V as the lower part (Step S66).

The controller 30 determines whether the lower part of the following vehicle V is deviated from the first clipping area A1 (Step S67). If the display video data generating unit 34 determines that the lower part of the following vehicle V is not deviated from the first clipping area A1 (NO at Step S67), the controller 30 proceeds to Step S68. If the display video data generating unit 34 determines that the lower part of the following vehicle V is deviated from the first clipping area A1 (YES at Step S67), the controller 30 proceeds to Step S69.

With reference to FIG. 17, a detailed example of the process performed by the controller 30 will be described. In the case of the captured video data 110A illustrated in FIG. 17, the wheel portions B1 of the following vehicle V that is located in the center among the two following vehicles V that appear in the captured video data 110A are deviated from the first clipping area A1. At Step S54, the controller 30 determines that the wheel portions B1 of the following vehicle V are deviated from the first clipping area A1 (YES at Step S54). At Step S56, the controller 30 sets the second clipping area A2 as the clipping area. At Step S57, the controller 30 generates the display video data 110B by clipping the second clipping area A2. At Step S58, the controller 30 causes the rearview monitor 3 to display the display video data 110B.

As described above, according to the fourth embodiment, the wheel portions B1 of the following vehicle V or the lower end portion of the body of the following vehicle V are/is identified as the lower part of the following vehicle V. According to the fourth embodiment, the wheel portions B1 of the following vehicle V or the lower end portion of the body of the following vehicle V are/is displayed on the display surface of the rearview monitor 3. Therefore, according to the fourth embodiment, it is possible to perform displaying such that a driver can easily recognize a positional relationship between the following vehicle V and the road surface, by displaying a certain part that is located as close as possible to the road surface among all parts of the following vehicle V in the captured video data 110A. In this manner, according to the fourth embodiment, it is possible to accurately recognize a distance to the following vehicle V even with use of an electronic rearview mirror that displays a real image.

Fifth Embodiment

Figure 20:
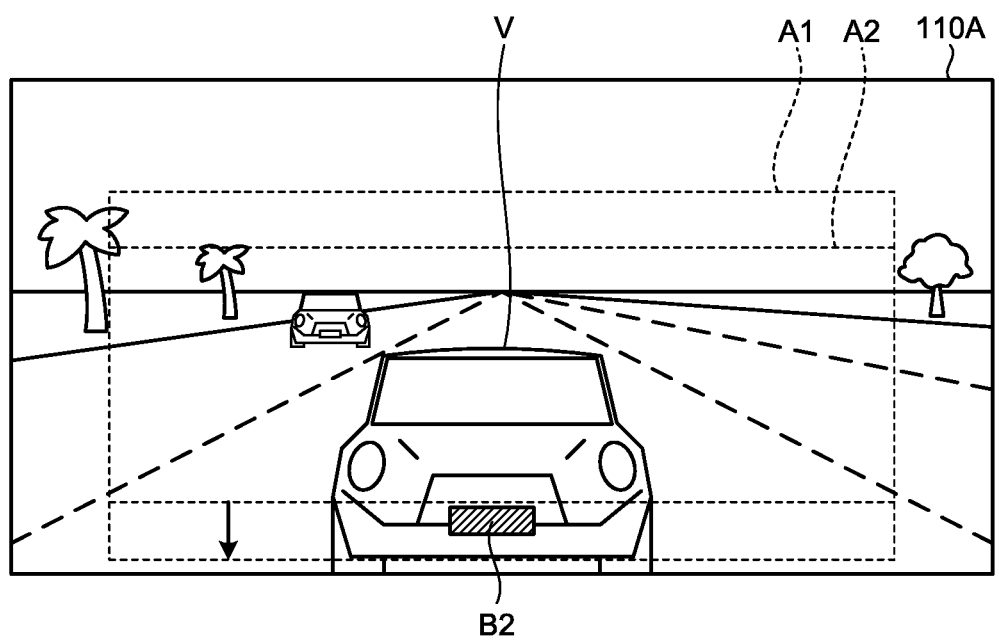
FIG. 20 is a diagram illustrating an example of captured video data obtained by imaging by an imager of an on-vehicle display system according to a fifth embodiment.

With reference to FIG. 20 and FIG. 21, the on-vehicle display system 1 according to a fifth embodiment will be described. FIG. 20 is a diagram illustrating an example of captured video data obtained through imaging by an imager of an on-vehicle display system according to the fifth embodiment. FIG. 21 is a flowchart illustrating an example of a flow of a process performed by a controller of an on-vehicle display controller of the on-vehicle display system according to the fifth embodiment.

The on-vehicle display system 1 according to the fifth embodiment is different from that of the first embodiment in that an identification sign portion B2 of the following vehicle V is identified as a lower part of a vehicle. In the fifth embodiment, a license plate is described as an identification sign portion. However, the identification sign portion is not limited to the license plate, but any sign for identifying a vehicle is applicable.

The identifying unit 33 identifies the license plate B2 of the following vehicle V as the lower part of the following vehicle V detected by the detecting unit 32 in the captured video data 110A. More specifically, the identifying unit 33 performs an image recognition process and identifies the license plate B2 of the following vehicle V in the captured video data 110A. In FIG. 20, the license plate is an area indicated by oblique lines. In the fifth embodiment, the identifying unit 33 identifies the license plate B2 on front side of the following vehicle V in the captured video data 110A.

The display video data generating unit 34 sets a clipping area of the captured video data 110A so as to include the license plate B2 of the following vehicle V identified by the identifying unit 33, and generates the display video data 110B by performing clipping from the captured video data 110A.

When the license plate B2 of the following vehicle V in the captured video data 110A is located outside the first clipping area A1 in the captured video data 110A, the display video data generating unit 34 determines that the license plate is deviated from the first clipping area A1. If it is determined that the license plate B2 of the following vehicle V is deviated from the first clipping area A1, the display video data generating unit 34 sets, as a clipping area, the second clipping area A2 that includes the license plate B2 of the following vehicle V.

Next, a flow of a process performed by the controller 30 will be described with reference to FIG. 21. The processes at Step S81 and Step S86 to Step S92 are the same as the processes at Step S61 and Step S65 to Step S71 in the flowchart illustrated in FIG. 19.

The controller 30 identifies the license plate B2 of the following vehicle V in the captured video data 110A (Step S82). More specifically, the controller 30 causes the identifying unit 33 to identify the license plate B2 of the following vehicle V detected by the detecting unit 32 in the captured video data 110A.

The controller 30 determines whether the license plate B2 of the following vehicle V is identified (Step S83). The controller 30 causes the identifying unit 33 to determine whether the license plate B2 of the following vehicle V is included in the captured video data 110A. If the identifying unit 33 determines that the license plate B2 of the following vehicle V is not identified (NO at Step S83), the controller 30 proceeds to Step S86. If the identifying unit 33 determines that the license plate B2 of the following vehicle V is identified (YES at Step S83) the controller 30 proceeds to Step S84.

The controller 30 determines whether the license plate B2 of the following vehicle V is located in the lower side of the vehicle body (Step S84). The controller 30 determines whether the license plate B2 of the following vehicle V is located in the lower side of the body of the following vehicle V in the captured video data 110A. If it is determined that the license plate B2 of the following vehicle V is not located in the lower side of the vehicle body (NO at Step S84), the controller 30 proceeds to Step S86. If it is determined that the license plate B2 of the following vehicle V is located in the lower side of the vehicle body (YES at Step S84), the controller 30 proceeds to Step S85.

If it is determined that the license plate B2 of the following vehicle V is located in the lower side of the vehicle body (YES at Step S84), the controller 30 sets the license plate B2 of the following vehicle V as the lower part (Step S85).

With reference to FIG. 20, a detailed example of the process performed by the controller 30 will be described. In the case of the captured video data 110A illustrated in FIG. 20, the license plate B2 of the following vehicle V that is located in the center among the two following vehicles V that appear in the captured video data 110A is deviated from the first clipping area A1. At Step S88, the controller 30 determines that the license plate B2 of the following vehicle V is deviated from the first clipping area A1 (YES at Step S88). At Step S89, the controller 30 sets the second clipping area A2 as the clipping area. At Step S91, the controller 30 generates the display video data 110B by clipping the second clipping area A2. At Step S92, the controller 30 causes the rearview monitor 3 to display the display video data 110B.

As described above, according to the fifth embodiment, the license plate B2 of the following vehicle V is identified as the lower part of the vehicle. According to the fifth embodiment, the license plate B2 of the following vehicle V is displayed on the display surface of the rearview monitor 3. Therefore, according to the fifth embodiment, it is possible to perform displaying such that a driver can easily recognize a positional relationship between the following vehicle V and the road surface, by displaying a certain part that is located as close as possible to the road surface among all parts of the following vehicle V in the captured video data 110A. In this manner, according to the fifth embodiment, it is possible to accurately recognize a distance to the following vehicle V even with use of an electronic rearview mirror that displays a real image.

The components of the on-vehicle display system 1 illustrated in the drawings are conceptual function, and need not be physically configured in the manner illustrated in the drawings. In other words, specific forms of the apparatuses are not limited to those illustrated in the drawings, and all or part of the apparatuses may be functionally or physically distributed or integrated in arbitrary units depending on various loads or use conditions.

The configuration of the on-vehicle display system 1 is realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present disclosure, various omission, replacement, and modifications of the components may be made.

The controller 30 may determine whether to perform the process in the flowchart illustrated in FIG. 7, based on the current position of the vehicle 100 before Step S11 of the flowchart illustrated in FIG. 7. For example, the controller 30 includes a current location data acquiring unit that acquires a current location of the vehicle 100 and a surrounding situation data acquiring unit that acquires a surrounding situation including map information, and if the vehicle 100 is travelling on a predetermined road, such as expressway, the controller 30 may not perform the process in the flowchart illustrated in FIG. 7. Alternatively, the controller 30 may include the current location data acquiring unit and the surrounding situation data acquiring unit, and if the vehicle 100 is travelling at a predetermined speed or higher, the controller 30 may not perform the process in the flowchart illustrated in FIG. 7. In this case, it is less expected that the following vehicle V approaches within, for example, 5 m of the vehicle 100 and the lower end portion B of the following vehicle V is deviated from the first clipping area A1. Consequently, it is possible to reduce load on the process performed by the controller 30.

The controller 30 may set the second clipping area A2 as the clipping area at Step S16 when the determination condition is continuously satisfied for a certain period of time at Step S13 in the flowchart illustrated in FIG. 7. With this operation, the on-vehicle display system 1 can prevent an unnecessary change of the video displayed on the rearview monitor 3. In this manner, the on-vehicle display system 1 can appropriately check surroundings of the vehicle 100.

The controller 30 may determine whether a relative speed of the following vehicle V and the vehicle 100, or a moving state such as a moving direction of the following vehicle V satisfy predetermined conditions, in addition to the determination at Step S22 in the flowchart illustrated in FIG. 12 or instead of the determination at Step S22. Further, for example, when the detecting unit 32 detects that the relative speed of the following vehicle V and the vehicle 100 is equal to or higher than a predetermined value, the controller 30 may determine that the moving state satisfies a predetermined condition and perform the processes from Step S23. Here, the relative speed of the following vehicle V and the vehicle 100 can be calculated based on a change in the size of the image of the following vehicle V in each of the frames in the captured video data 110A. Furthermore, for example, when the detecting unit 32 detects that the moving direction of the following vehicle V is a direction approaching the vehicle 100, the controller 30 may determine that the moving state satisfies a predetermined condition and perform the processes from Step S23. The controller 30 may perform determination using a combination of the determination conditions as described above. Through the operation as described above, the on-vehicle display system 1 can appropriately check surroundings of the vehicle 100.

When setting the second clipping area A2 as the clipping area, the controller 30 may display the display video data 110B in a translucent color having a predetermined translucency. With this operation, the on-vehicle display system 1 can easily confirm that the rearview monitor 3 displays the display video data 110B that is obtained by clipping the second clipping area A2. In this manner, the on-vehicle display system 1 can appropriately check surroundings of the vehicle 100.

When the detecting unit 32 detects the following vehicle V, if the following vehicle V has a license plate, the detecting unit 32 may read alphanumeric characters and signs on the license plate and detect the following vehicle V without using a recognition dictionary stored in the recognition dictionary storage unit 200. With this operation, the on-vehicle display system 1 can be configured simply.

Furthermore, in the embodiments described above, a case has been described in which the rearview monitor 3 is configured as an electronic rearview mirror. However, the mode of the rearview monitor 3 is not limited to the electronic rearview mirror. For example, when the present application is applied for use when the vehicle 100 is moving forward, it is effective that the present application is embodied in the electronic rearview mirror. When the present application is applied in order to check a vehicle that is stopped on the rear side of the vehicle 100 while the vehicle 100 is stopped or moving backward, the rearview monitor 3 may be mounted at any position that can be viewed by a driver, or may be configured as a portable type and placed behind the driver so as to be viewed by the driver while the vehicle is moving backward.

According to the present application, it is possible to easily recognize a distance to a following vehicle.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle display controller comprising:
    a video data acquiring unit configured to acquire captured video data obtained through imaging by an imager that is configured to image surroundings of a vehicle;
    a detecting unit configured to detect a following vehicle in the captured video data;
    an identifying unit configured to identify a lower part of the following vehicle detected by the detecting unit;
    a display video data generating unit configured to generate display video data by clipping a predetermined clipping area from the captured video data, and to set, in response to determining that the lower part of the following vehicle identified by the identifying unit has deviated from the predetermined clipping area, a clipping area of the captured video data so as to include the lower part of the following vehicle, and generate the display video data by clipping the clipping area from the captured video data; and
    a display controller configured to cause a display used in the vehicle to display the display video data generated by the display video data generating unit.

2. The on-vehicle display controller according to claim 1, wherein
    the identifying unit identifies a lower end portion of the following vehicle as the lower part of the following vehicle detected by the detecting unit.

3. The on-vehicle display controller according to claim 1, wherein
    the identifying unit identifies wheel portions of the following vehicle as the lower part of the following vehicle detected by the detecting unit.

4. The on-vehicle display controller according to claim 1, wherein
    the identifying unit identifies an identification sign portion of the following vehicle as the lower part of the following vehicle detected by the detecting unit.

5. The on-vehicle display controller according to claim 1, wherein the display video data generating unit sets the clipping area by shifting the predetermined clipping area in a direction that causes the lower part of the following vehicle to be included in the clipping area.

6. The on-vehicle display controller according to claim 1, wherein the display video data generating unit sets the clipping area of the captured video data so as to include a road surface that is present below the lower part of the following vehicle identified by the identifying unit.

7. The on-vehicle display controller according to claim 1, wherein the display video data generating unit sets the clipping area such that the lower part of the following vehicle detected by the detecting unit is not deviated from a lower side of the clipping area of the captured video data.

8. The on-vehicle display controller according to claim 1, wherein
    in response to determining that a plurality of following vehicles detected by the detecting unit are present, the identifying unit identifies a lower part of a following vehicle, of the plurality of following vehicles, that is located closest to a rear end portion of the vehicle, and the display video data generating unit sets the clipping area of the captured video data so as to include the lower part of the following vehicle that is located closest to the rear end portion of the vehicle.

9. The on-vehicle display controller according to claim 1, wherein
in response to detecting that a plurality of following vehicles detected by the detecting unit are present, the identifying unit identifies a lower part of a following vehicle, of the plurality of following vehicles, that is located in a most central portion in the captured video data, and
the display video data generating unit sets the clipping area of the captured video data so as to include the lower part of the following vehicle located in the most central portion in the captured video data.

10. The on-vehicle display controller according to claim 1, further comprising:
an adjacency determining unit configured to determine whether the following vehicle detected by the detecting unit is located within a defined proximity of the vehicle, wherein
in response to a determination by the adjacency determining unit that the following vehicle detected by the detecting unit is located within the defined proximity of the vehicle, the identifying unit identifies the lower part of the following vehicle detected by the detecting unit.

11. The on-vehicle display controller according to claim 10, wherein the adjacency determining unit determines that the following vehicle detected by the detecting unit is located within the defined proximity of the vehicle based on a determination that a width of the following vehicle is equal to or larger than a predetermined percent of a size of the captured video data.

12. An on-vehicle display system comprising:
the on-vehicle display controller according to claim 1; and
at least one of the imager and the display.

13. An on-vehicle display control method comprising steps of:

acquiring captured video data obtained through imaging by an imager that is configured to image surroundings of a vehicle;
detecting a following vehicle in the captured video data;
identifying a lower part of the following vehicle detected by the detecting;
generating display video data by clipping a predetermined clipping area from the captured video data acquired by the acquiring, and in response to determining that the lower part of the following vehicle identified by the identifying has deviated from the predetermined clipping area, setting a clipping area of the captured video data so as to include the lower part of the following vehicle identified at the identifying; and
causing a display in the vehicle to display the display video data generated at the generating.

14. A non-transitory storage medium that stores a program for causing a computer serving as an on-vehicle display controller to execute steps of:
acquiring captured video data obtained through imaging by an imager that is configured to image surroundings of a vehicle;
detecting a following vehicle in the captured video data;
identifying a lower part of the following vehicle detected by the detecting;
generating display video data by clipping a first clipping area from the captured video data acquired by the acquiring;
in response to determining that the lower part of the following vehicle identified by the identifying has deviated from the predetermine first area, setting a second clipping area of the captured video data so as to include the lower part of the following vehicle identified at the identifying; and
causing a display in the vehicle to display the display video data generated at the generating.

* * * * *